US010412709B2

(12) United States Patent
Shimada

(10) Patent No.: US 10,412,709 B2
(45) Date of Patent: Sep. 10, 2019

(54) COMMUNICATION APPARATUS CAPABLE OF ESTABLISHING WIRELESS CONNECTION WITH ACCESS POINT

(71) Applicant: Brother Kogyo Kabushiki Kaisha, Nagoya-shi, Aichi-ken (JP)

(72) Inventor: Yusuke Shimada, Owariasahi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 94 days.

(21) Appl. No.: 15/337,051

(22) Filed: Oct. 28, 2016

(65) Prior Publication Data

US 2017/0127384 A1 May 4, 2017

(30) Foreign Application Priority Data

Oct. 30, 2015 (JP) ................................ 2015-215056

(51) Int. Cl.
*H04W 4/80* (2018.01)
*H04M 1/725* (2006.01)
(Continued)

(52) U.S. Cl.
CPC ............. *H04W 72/04* (2013.01); *H04W 4/80* (2018.02); *H04W 28/0205* (2013.01);
(Continued)

(58) Field of Classification Search
CPC ... H04W 72/04; H04W 4/80; H04W 28/0205; H04W 88/10; H04W 84/12; H04W 88/02
See application file for complete search history.

(56) References Cited

U.S. PATENT DOCUMENTS 8,761,118 B2 6/2014 Aibara et al.
8,854,667 B2 10/2014 Ishii
(Continued)

FOREIGN PATENT DOCUMENTS

JP H09-116625 A 5/1997
JP 2008-182439 A 8/2008
(Continued)

OTHER PUBLICATIONS

Jun. 11, 2019—(JP) Notification of Reason for Rejection—App 2015-215056.
(Continued)

*Primary Examiner* — Ivan O Latorre
(74) *Attorney, Agent, or Firm* — Banner & Witcoff, Ltd.

(57) ABSTRACT

A communication apparatus may comprise a first wireless interface for executing a wireless communication in accordance with a first communication scheme and a second wireless interface for executing a wireless communication in accordance with a second communication scheme. The communication apparatus may receive first access point information from an external apparatus via the first interface, execute a first establishing process for establishing a first wireless connection via the second interface with a first access point using the first access point information, communicate with a particular apparatus via the second interface while relaying the first access point in a case where the establishment of the first wireless connection succeeds, and send failure information to the external apparatus via the first interface in a case where the establishment of the first wireless connection fails.

19 Claims, 9 Drawing Sheets

(First and Second Embodiments)

(51) Int. Cl.

| | |
|---|---|
| ***H04W 28/02*** | (2009.01) |
| ***H04W 72/04*** | (2009.01) |
| ***H04W 76/12*** | (2018.01) |
| ***H04W 84/12*** | (2009.01) |
| ***H04W 88/02*** | (2009.01) |
| ***H04W 88/10*** | (2009.01) |

(52) U.S. Cl.

CPC .......... *H04W 76/12* (2018.02); *H04M 1/7253* (2013.01); *H04M 2250/06* (2013.01); *H04W 84/12* (2013.01); *H04W 88/02* (2013.01); *H04W 88/10* (2013.01)

(56) References Cited

U.S. PATENT DOCUMENTS

| | | | | | |
|---|---|---|---|---|---|
| 9,294,870 | B2 | 3/2016 | Matsuda | | |
| 9,350,813 | B2 | 5/2016 | Kubota et al. | | |
| 9,749,844 | B1 * | 8/2017 | Sovani | H04W 48/16 | |
| 9,830,118 | B2 | 11/2017 | Kubota et al. | | |
| 10,191,700 | B2 | 1/2019 | Kubota et al. | | |
| 2006/0179147 | A1 * | 8/2006 | Tran | G06F 11/2012 | 709/227 |
| 2007/0224980 | A1 * | 9/2007 | Wakefield | G08B 13/1427 | 455/418 |
| 2009/0046686 | A1 * | 2/2009 | Izaki | H04W 8/20 | 370/338 |
| 2009/0262716 | A1 * | 10/2009 | Kawakami | H04W 48/20 | 370/338 |
| 2010/0245931 | A1 * | 9/2010 | Sato | H04N 1/00315 | 358/407 |
| 2010/0254349 | A1 | 10/2010 | Aibara et al. | | |
| 2010/0265830 | A1 * | 10/2010 | Hayashi | H04B 7/18523 | 370/243 |
| 2011/0176417 | A1 * | 7/2011 | Kuwabara | H04W 36/22 | 370/230 |
| 2012/0293825 | A1 * | 11/2012 | Ishii | G06F 3/1207 | 358/1.14 |
| 2014/0094117 | A1 * | 4/2014 | Rajendran | H04W 12/04 | 455/41.1 |
| 2014/0320911 | A1 * | 10/2014 | Nagano | H04N 1/00217 | 358/1.15 |
| 2014/0349577 | A1 | 11/2014 | Matsuda | | |
| 2014/0355047 | A1 * | 12/2014 | Lee | G06F 3/1292 | 358/1.15 |
| 2015/0038087 | A1 * | 2/2015 | Park | H04W 76/14 | 455/41.3 |
| 2015/0188611 | A1 | 7/2015 | Tsuzuki | | |
| 2015/0189023 | A1 | 7/2015 | Kubota et al. | | |
| 2015/0193296 | A1 * | 7/2015 | Chen | G06F 11/079 | 714/15 |
| 2016/0098473 | A1 * | 4/2016 | Hosokawa | G06F 17/30705 | 707/737 |
| 2016/0105582 | A1 * | 4/2016 | Nakajima | G06F 3/1238 | 358/1.15 |
| 2016/0192124 | A1 | 6/2016 | Matsuda | | |
| 2016/0219637 | A1 * | 7/2016 | Dory | H04B 5/0031 | |
| 2016/0253135 | A1 | 9/2016 | Kubota et al. | | |
| 2018/0024792 | A1 | 1/2018 | Kubota et al. | | |
| 2019/0010981 | A1 | 1/2019 | Chen et al. | | |

FOREIGN PATENT DOCUMENTS

| | | | |
|---|---|---|---|
| JP | 2010-245748 | A | 10/2010 |
| JP | 2012-227786 | A | 11/2012 |
| JP | 2012-243142 | A | 12/2012 |
| JP | 2014-075622 | A | 4/2014 |
| JP | 2014-192821 | A | 10/2014 |
| JP | 2015-126491 | A | 7/2015 |
| JP | 2015-126501 | A | 7/2015 |

OTHER PUBLICATIONS

Brother, MFC-490CN, FAQs (Q&A), how to connect to wireless LAN through manual setting on operation panel, [online], searched on Jun. 3, 2019], the Internet <URL:https://support.brother.co.jo/j/b/faqend,aspx?c=jp&lang=ja&prod=mfc490cn&faqid=faq00012601_000>, Mar. 9, 2018, ID:faq00012601_000, steps 1 to 8.

* cited by examiner (First and Second Embodiments)

(First Embodiment)

(Second Embodiment)

COMMUNICATION APPARATUS CAPABLE OF ESTABLISHING WIRELESS CONNECTION WITH ACCESS POINT

CROSS-REFERENCE TO RELATED APPLICATION

This application claims priority to Japanese Patent Application No. 2015-215056, filed on Oct. 30, 2015, the entire contents of which are hereby incorporated by reference into the present application.

TECHNICAL FIELD

The technique disclosed in the present teachings relates to a communication apparatus capable of establishing a wireless connection with an access point.

DESCRIPTION OF RELATED ART

A communication apparatus capable of receiving access point information from an external apparatus is known. The access point information is information to be used for establishing a wireless connection with an access point, and includes, e.g., an SSID (abbreviation of Service Set Identifier), password, etc. The communication apparatus may establish a wireless connection with the access point by using the received access point information.

SUMMARY

The communication apparatus may fail in establishing a wireless connection with the access point by using the received access point information. Consequently, a user of the external apparatus needs to be notified with information relating to such a failure. The present teachings disclose a technique which may output information relating to failure of the communication apparatus to establish a wireless connection with the access point.

A communication apparatus disclosed herein may comprise: a first wireless interface for executing a wireless communication in accordance with a first communication scheme; a second wireless interface for executing a wireless communication in accordance with a second communication scheme different from the first communication scheme; and a processor; and a memory storing computer-readable instructions therein, the computer-readable instructions, when executed by the processor, causing the communication apparatus to perform: receiving first access point information from an external apparatus via the first interface, the first access point information being information to be used for establishing a first wireless connection via the second interface with a first access point; executing a first establishing process for establishing the first wireless connection with the first access point using the first access point information; in a case where the establishment of the first wireless connection succeeds, communicating with a particular apparatus via the second interface while relaying the first access point; and in a case where the establishment of the first wireless connection fails, sending, to the external apparatus, failure information related to failure of the establishment of the first wireless connection via the first interface.

Moreover, a communication apparatus is disclosed herein which may comprise a memory storing computer-readable instructions therein, the computer-readable instructions, when executed by the processor, causing the communication apparatus to perform: in a case where the establishment of the first wireless connection fails, outputting failure information relating to a failure of the establishment of the first wireless connection instead of the above sending. The computer-readable instructions, when executed by the processor, may cause the communication apparatus to further perform: setting the communication apparatus in a prohibition mode at a first timing after the establishment of the first wireless connection failed, the prohibition mode being for prohibiting the communication apparatus from using the first access point information; and canceling the prohibition mode at a second timing at which a predetermined movement performed by a user is detected after the communication apparatus is set in the prohibition mode, the predetermined movement including at least one of a movement for outputting the failure information, a movement for ending output of the failure information, and a movement for ending a state capable of outputting the failure information.

A method performed by the aforementioned communication apparatus, a computer program, and a computer-readable recording medium which stores the computer program, are also novel and useful.

EMBODIMENT

Figure 1:
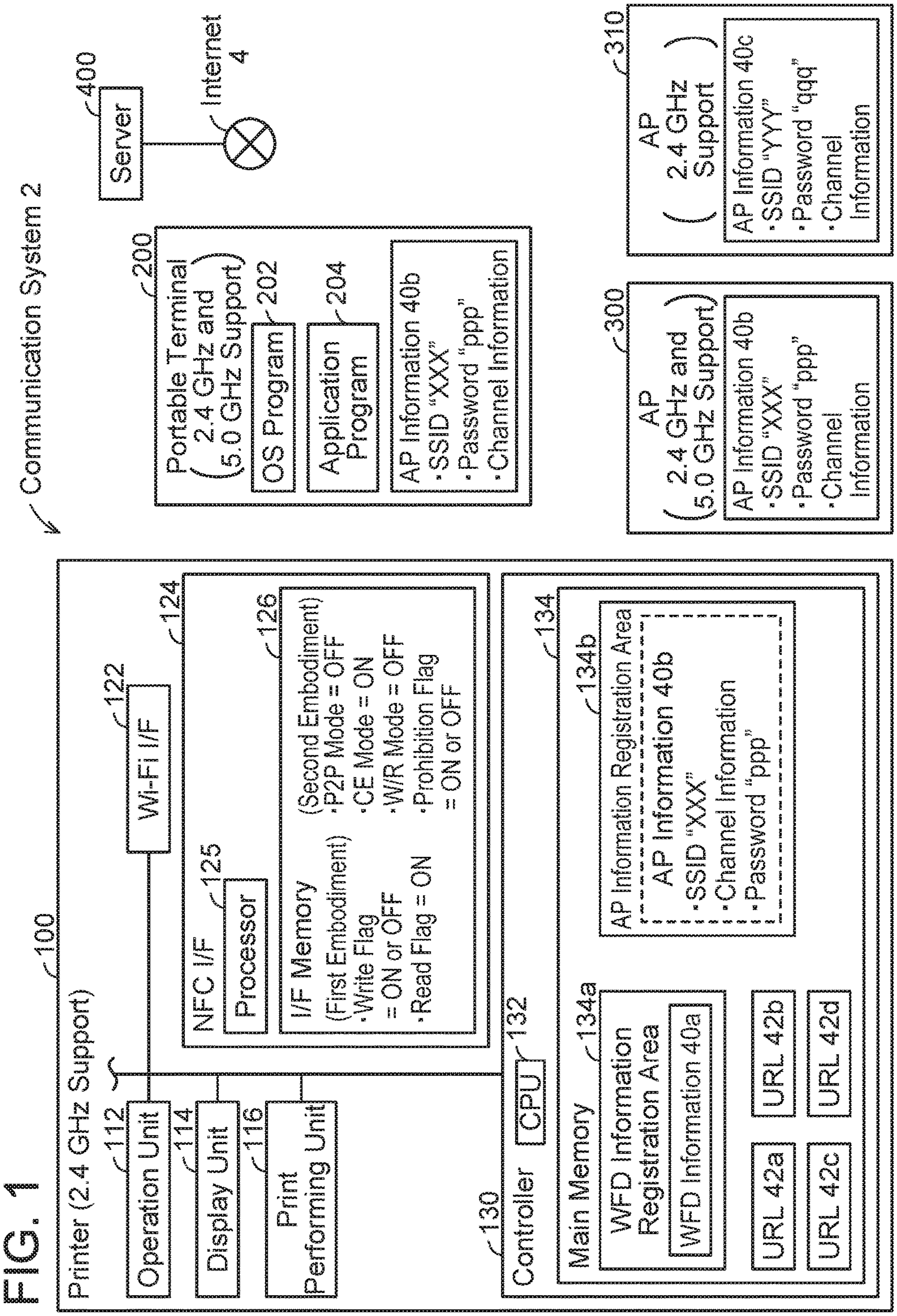
FIG. 1 shows a configuration of a communication system.

First Embodiment (Configuration of Communication System 2; FIG. 1)

A communication system 2 comprises a printer 100, a portable terminal 200, APs (abbreviation of Access Point) 300, 310, and a server 400. The printer 100 and the portable terminal 200 are each capable of executing wireless communication in accordance with the Wi-Fi scheme (called "Wi-Fi communication" below), and wireless communication in accordance with the NFC (abbreviation of Near Field Communication) scheme (called "NFC communication" below).

(Configuration of Printer 100)

The printer 100 is a peripheral apparatus of a PC (abbreviation of Personal Computer), etc. and is a peripheral apparatus capable of executing a print function. The printer 100 comprises an operation unit 112, a display unit 114, a print performing unit 116, a Wi-Fi interface 122, an NFC interface 124, and a controller 130. Each of the units 112 to 130 is connected to a bus wire (reference number omitted). Below, interface may be referred to as "I/F".

The operation unit 112 comprises a plurality of keys. A user can input various instructions to the printer 100 by operating the operation unit 112. The display unit 114 is a display for displaying various information. Moreover, the display unit 114 may also function as an operation unit such as a touch panel, etc. The print performing unit 116 is an ink jet scheme, laser scheme, etc. printing mechanism.

The Wi-Fi I/F 122 is an I/F for executing a Wi-Fi communication. The Wi-Fi scheme is a wireless communication scheme based on the standards developed by the Wi-Fi Alliance, e.g., IEEE (abbreviation of The Institute of Electrical and Electronics Engineers, Inc.) standard 802.11 and standards conforming thereto (e.g., 802.11a, 11b, 11g, 11n, etc.). The Wi-Fi I/F 122, in particular, supports WFD (abbreviation of Wi-Fi Direct (registered trademark)) scheme developed by the Wi-Fi Alliance and is capable of executing wireless communication in accordance with the WFD scheme (called "WFD communication" below).

In Wi-Fi communication, radio waves (i.e., carrier waves) of either of the two types of frequency band 2.4 GHz and 5.0 GHz are used. Of the two types of frequency band, the Wi-Fi I/F 122 supports only the 2.4 GHz frequency band, and does not support the 5.0 GHz frequency band. That is, the Wi-Fi I/F 122 is capable of executing wireless communication using 2.4 GHz radio waves, and is not capable of executing wireless communication using 5.0 GHz radio waves. Below, the Wi-Fi I/F 122 supporting only the 2.4 GHz frequency band may be described as "the printer 100 corresponds only to 2.4 GHz".

The NFC I/F 124 is a wireless I/F for executing an NFC communication. The NFC scheme is a wireless communication scheme based on, e.g., international standard ISO/IEC 21481 or 18092. The NFC I/F 124 comprises a processor 125, and an I/F memory 126. The processor 125 is capable of communicating with the controller 130, and executes various processes in accordance with a program (not shown) in the I/F memory 126. The I/F memory 126 is a memory for storing information to be sent to an external. WFD information 40*a* being stored in a main memory 134 (to be described), and URLs (abbreviation of Uniform Resource Locator) 42*a* to 42*d*, etc. may be stored in the I/F memory 126.

The I/F memory 126 further stores a Write flag and a Read flag. The Write flag indicates either ON or OFF; ON meaning that the printer 100 permits reception and use of information from an external via the NFC I/F 124 (i.e., permits the information to be written from the external), and OFF meaning that the above is not permitted. The Read flag indicates ON, meaning that the printer 100 permits sending of information to the external via the NFC I/F 124 (i.e., permits the information to be read from the external). That is, the Read flag is always maintained in ON.

Moreover, an I/F called an NFC forum device (NFC Forum Device), and an I/F called an NFC tag (NFC Tag), are known as types of I/F for executing an NFC communication. The NFC forum device is an I/F capable of selectively operating in any of P2P (abbreviation of Peer To Peer) mode, R/W (abbreviation of Reader/Writer) mode, and CE (abbreviation of Card Emulation) mode. The NFC tag is not an I/F capable of selectively operating in any of these modes, and functions as an IC tag of the NFC scheme. In the present embodiment, the NFC I/F 124 is an NFC tag.

Here, differences between the Wi-Fi I/F 122 and the NFC I/F 124 will be described. A communication speed of a wireless communication via the Wi-Fi I/F 122 (e.g., maximum communication speed is 11 to 600 Mbps) is faster than a communication speed of a wireless communication via the NFC I/F 124 (e.g., maximum communication speed is 100 to 424 Kbps). Further, a frequency of a carrier wave (e.g. a 2.4 GHz band) upon a wireless communication via the Wi-Fi I/F 122 is different from a frequency of a carrier wave (e.g. a 13.56 MHz band) upon a wireless communication via the NFC I/F 124. Further, a maximum distance of a wireless communication that can be performed via the Wi-Fi I/F 122 (e.g., about 100 m at maximum) is greater than a maximum distance of a wireless communication that can be performed via the NFC I/F 124 (e.g., about 10 cm at maximum).

The controller 130 comprises a CPU 132 and the main memory 134. The CPU 132 is a processor which performs various processes in accordance with a program stored in the main memory 134. The main memory 134 is configured by a RAM, ROM, etc., and stores various information in addition to the aforementioned program. Further, the main memory 134 comprises a WFD information registration area 134*a* and an AP information registration area 134*b*.

The WFD information registration area 134*a* is a area in which WFD information 40*a* is registered from the shipping stage of the printer 100. The WFD information 40*a* is wireless setting information for establishing a wireless connection in accordance with the WFD scheme (called "WFD connection" below) with the printer 100. When the power of the printer 100 is turned ON, the printer 100 is in a device state which is neither G/O (abbreviation of Group Owner) state or CL (abbreviation of Client) state of the WFD scheme and, at a predetermined timing, moves from device state to G/O state, forming a wireless network (called "WFD network" below). The WFD information 40*a* includes SSID (abbreviation of Service Set Identifier), password, and channel information used in that WFD network. Moreover, when the power of the printer 100 is turned ON, the WFD information 40*a* is also stored in the I/F memory 126.

The AP information registration area 134*b* is an area for registering AP information. The AP information is information to be used for establishing a wireless connection in accordance with the Wi-Fi scheme (called "AP connection" below) with an AP. FIG. 1 shows a state in which AP information 40*b* is registered in the AP information registration area 134*b*. The AP information 40*b* is information to be used for establishing an AP connection with the AP 300, and includes an SSID "XXX", password "ppp", and channel information. The SSID "XXX" is an identifier for identifying the wireless network formed by the AP 300 (called "AP network" below). The password "ppp" is information used in authentication and encryption in the AP network. The channel information indicates the value of a wireless channel used in the AP network (i.e., any value from among 1 to 13 ch and 36 to 100 ch). Moreover, below, network is referred to as "NW".

The main memory 134 further stores a plurality of URLs 42*a* to 42*d*. The URLs 42*a* to 42*d* are information to be sent to an external in a case where the printer 100 fails to establish an AP connection. The URLs 42*a* to 42*d* are position information indicating the position of a Web page (called "detail page" below) indicating both the cause of failure to establish an AP connection, and a measure for eliminating that cause.

(Configuration of Portable Terminal 200)

The portable terminal 200 is a portable terminal device such as a mobile telephone (e.g. a smartphone), a PDA, a notebook PC, a tablet PC, a portable music playback device or a mobile movie playback device. The portable terminal 200 comprises a Wi-Fi I/F, an NFC I/F, and a cellular I/F (these are not shown). The Wi-Fi I/F of the portable terminal 200 is basically the same as the Wi-Fi I/F 122, but supports both the 2.4 GHz frequency band and the 5.0 GHz frequency band. That is, the portable terminal 200 corresponds to both 2.4 GHz and 5.0 GHz. The NFC I/F of the portable terminal 200 is an NFC forum device, and usually operates in a state in which P2P mode and R/W mode are enabled, and CE mode is disabled. Moreover, in a modification, the NFC I/F usually operates in a state in which R/W mode and P2P mode are disabled, and CE mode is enabled and, in a case where an application program 204 (to be described) is started, may shift to a state in which P2P mode and R/W mode are enabled, and CE mode is disabled. The cellular I/F is an I/F for executing a wireless communication in accordance with a cellular scheme (e.g., 3G (3rd Generation) scheme, 4G (4th Generation) scheme, etc.). The portable terminal 200 may execute communication via the cellular I/F with an apparatus (e.g., the server 400) on an internet 4.

The portable terminal 200 comprises a memory (not shown) and, in a case where the portable terminal 200 has achieved establishment of an AP connection with an AP, the memory stores AP information (e.g., the AP information 40*b* of the AP 300). The memory further stores an OS (abbreviation of Operating System) program 202, and the application program 204. The OS program 202 is a program for realizing basic processing, and can start, e.g., a Web browser program for browsing Web pages. The application program 204 is a program for executing communication with the printer 100, and is, e.g., installed by a vendor of the printer 100 from a server installed on the internet 4.

(Configuration of APs 300, 310)

The APs 300, 310 are known APs called a wireless AP, wireless LAN router, or the like, and relay communication between a pair of apparatuses belonging to an APNW. The AP 300 corresponds to both 2.4 GHz and 5.0 GHz, and forms an APNW by using the AP information 40*b*. The AP 310 corresponds to only 2.4 GHz, and forms an APNW by using AP information 40*c*. The AP information 40*c* includes an SSID "YYY", a password "qqq", and channel information.

(Configuration of Server 400)

The server 400 is installed on the internet 4 by the vendor of the printer 100. The server 400 stores page information representing the detail pages indicated by the URLs 42*a* to 42*d* in the printer 100.

Figure 2:
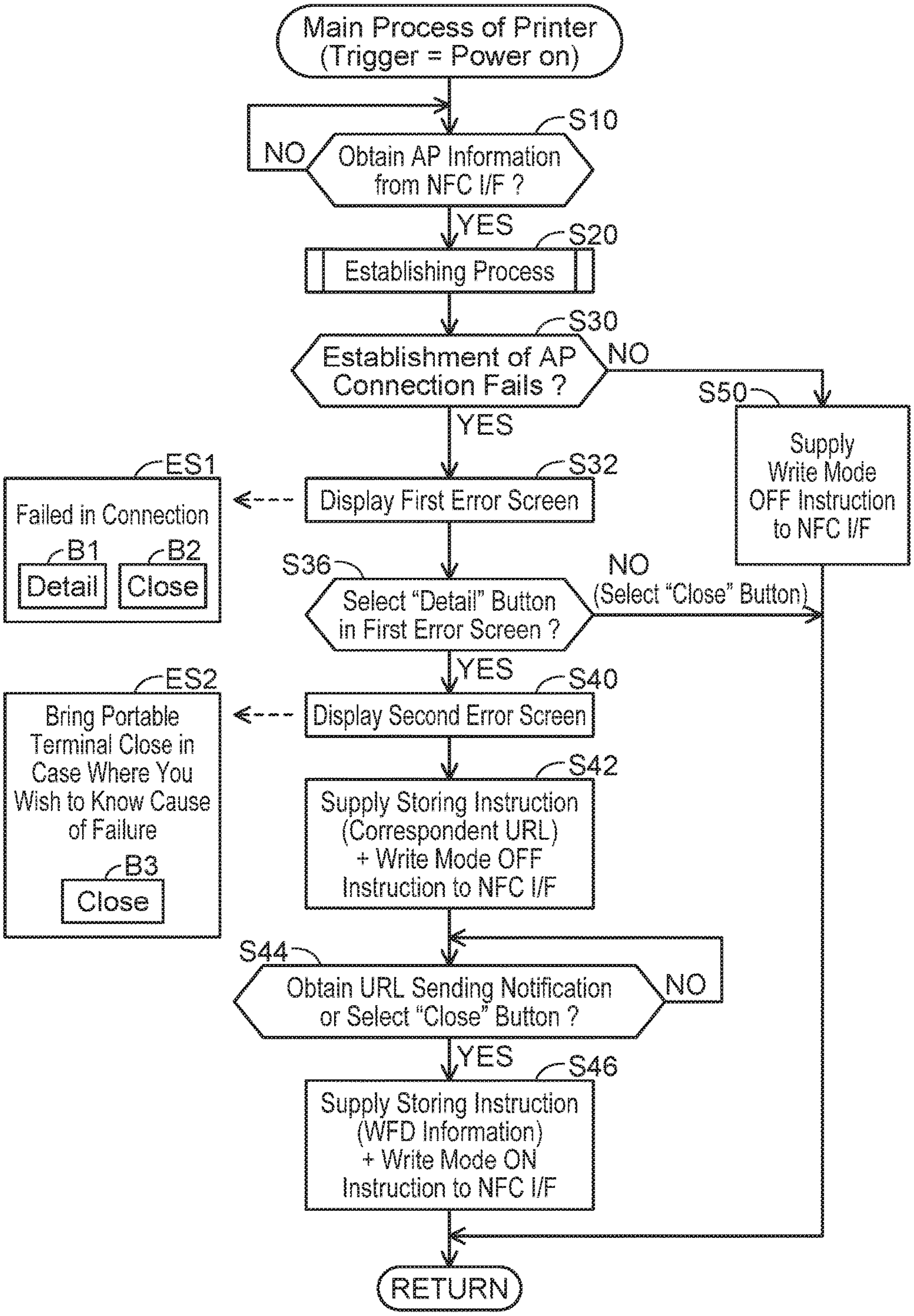
FIG. 2 shows a flowchart of a main process of a printer.

(Main Process of Printer 100; FIG. 2)

Next, contents of a main process executed by the CPU 132 of the printer 100 will be described with reference to FIG. 2. The main process starts with the power of the printer 100 being turned ON as a trigger.

In S10, the CPU 132 monitors whether AP information has been obtained from the NFC I/F 124. In case of receiving the AP information from the portable terminal 200, the NFC I/F 124 supplies the AP information to the CPU 132. Moreover, the situation in which the NFC I/F 124 receives the AP information from the portable terminal 200 is as follows. When the power of the printer 100 is turned ON, the Write flag of the NFC I/F 124 is set to ON. After having performed a sending operation on the portable terminal 200 for sending the AP information to the printer 100, the user brings the portable terminal 200 close to the printer 100. When the distance between the NFC I/F of the portable terminal 200 and the NFC I/F 124 of the printer 100 becomes less than a predetermined distance (e.g., 10 cm), an NFC connection is established between these I/Fs. Since the Write flag is ON, the NFC I/F 124 receives the AP information from the portable terminal 200, and supplies the AP information to the CPU 132. In this case, the CPU 132 determines YES in S10, and proceeds to S20. Moreover, below, the AP information obtained in S10 is called "target AP information".

In S20, the CPU 132 executes an establishing process. In the establishing process, the CPU 132 tries, by using the target AP information, to establish an AP connection with an AP (called "target AP" below) forming the APNW specified by that target AP information. In the case where establishment of the AP connection fails, the CPU 132 identifies the cause of that failure.

In S30, the CPU 132 determines whether establishment of the AP connection failed. Specifically, the CPU 132 determines whether a failure flag (not shown) indicating whether the establishment of the AP connection failed is set to ON. The CPU 132 proceeds to S32 in a case where the failure flag is set to ON (YES in S30), and proceeds to S50 in a case where the failure flag is set to OFF (NO in S30).

In S32, the CPU 132 causes the display unit 114 to display a first error screen ES1. The first error screen ES1 is a screen for causing the user to select whether sending of failure information is necessary (i.e., a correspondent URL; to be described) relating to failure to establish the AP connection. The first error screen ES1 includes a message indicating that establishment of the AP connection failed, a "detail" button B1, and a "close" button B2. The "detail" button B1 is a button for selecting necessity of sending the failure information. The "close" button B2 is a button for selecting unnecessity of sending the failure information, and is a button for ending the display of the first error screen ES1.

In S36, the CPU 132 determines whether the "detail" button B1 has been selected in the first error screen ES1. The CPU 132 proceeds to S40 in a case where the "detail" button B1 has been selected (YES in S36). On the other hand, in a case where the "close" button B2 has been selected in the first error screen ES1 (NO in S36), the CPU 132 skips S40 and subsequent processes, and returns to S10. In this case, the printer 100 does not execute the processes for sending the failure information to the portable terminal 200 (S40, S42, etc.). Consequently, the processing load of the printer 100 can be reduced.

In S40, the CPU 132 causes the display unit 114 to display a second error screen ES2. The second error screen ES2 includes a message recommending the user to bring the portable terminal 200 close to the printer 100, and a "close" button B3. The "close" button B3 is a button for selecting unnecessity of sending the failure information, and is a button for ending the display of the second error screen ES2.

In S42, the CPU 132 first identifies, from among the plurality of URLs 42*a* to 42*d*, the URL (called "correspondent URL" below) corresponding to the error identified in the establishing process of S20 (i.e., the cause of failure to establish the AP connection). Then, the CPU 132 supplies a storing instruction including the correspondent URL, and a Write mode OFF instruction, to the NFC I/F 124. The storing instruction is an instruction for deleting the WFD information 40*a* from the I/F memory 126, and storing the correspondent URL in the I/F memory 126. The Write mode OFF instruction is an instruction for setting the Write flag to OFF. Thereby, in the I/F memory 126, the correspondent URL is stored instead of the WFD information 40*a*, and the Write flag is set to OFF.

In S44, the CPU 132 monitors whether a URL sending notification has been received from the NFC I/F 124, and whether the "close" button B3 has been selected in the second error screen ES2. In a case where the correspondent URL has been sent to the portable terminal 200, the NFC I/F 124 supplies the URL sending notification to the CPU 132. The situation in which the NFC I/F 124 sends the correspondent URL to the portable terminal 200 is as follows. That is, in accordance with the message in the second error screen ES2, the user brings the portable terminal 200 close to the printer 100. When the distance between the NFC I/F of the portable terminal 200 and the NFC I/F 124 of the printer 100 becomes less than a predetermined distance (e.g., 10 cm), an NFC connection is established between these I/Fs. Since the Read flag is ON, the NFC I/F 124 sends the correspondent URL in the I/F memory 126 to the portable terminal 200. In the case of receiving the URL sending notification from the NFC I/F 124 (YES in S44), the CPU 132 proceeds to S46. Further, in a case where the "close" button B3 has been selected in the second error screen ES2 without sending the correspondent URL (YES in S44), the CPU 132 proceeds to S46. That is, in S44, the CPU 132 monitors whether either a movement for bringing the portable terminal 200 close to the printer 100 (i.e., a movement for outputting the correspondent URL), or a movement for selecting the "close" button B3, is detected.

In S46, the CPU 132 supplies the storing instruction including the WFD information 40*a*, and a Write mode ON instruction, to the NFC I/F 124. The storing instruction is an instruction for deleting the correspondent URL from the I/F memory 126, and storing the WFD information 40*a* in the I/F memory 126. The Write mode ON instruction is an instruction for setting the Write flag to ON. Thereby, the WFD information 40*a* is stored instead of the correspondent URL in the I/F memory 126, and the Write flag is set to ON. Moreover, although not shown, in S46, the CPU 132 ends the display of the second error screen ES2. When S46 ends, the process returns to S10.

In S50, the CPU 132 supplies the Write mode OFF instruction to the NFC I/F 124. Thereby, the Write flag is set to OFF. That is, since the NFC I/F 124 becomes unable to receive new AP information, it is possible to suppress deletion of the target AP information, with which establishment of a wireless connection with the target AP succeeded, from the AP information registration area 134*b* in the main memory 134. When S50 ends, the process returns to S10.

Figure 3:
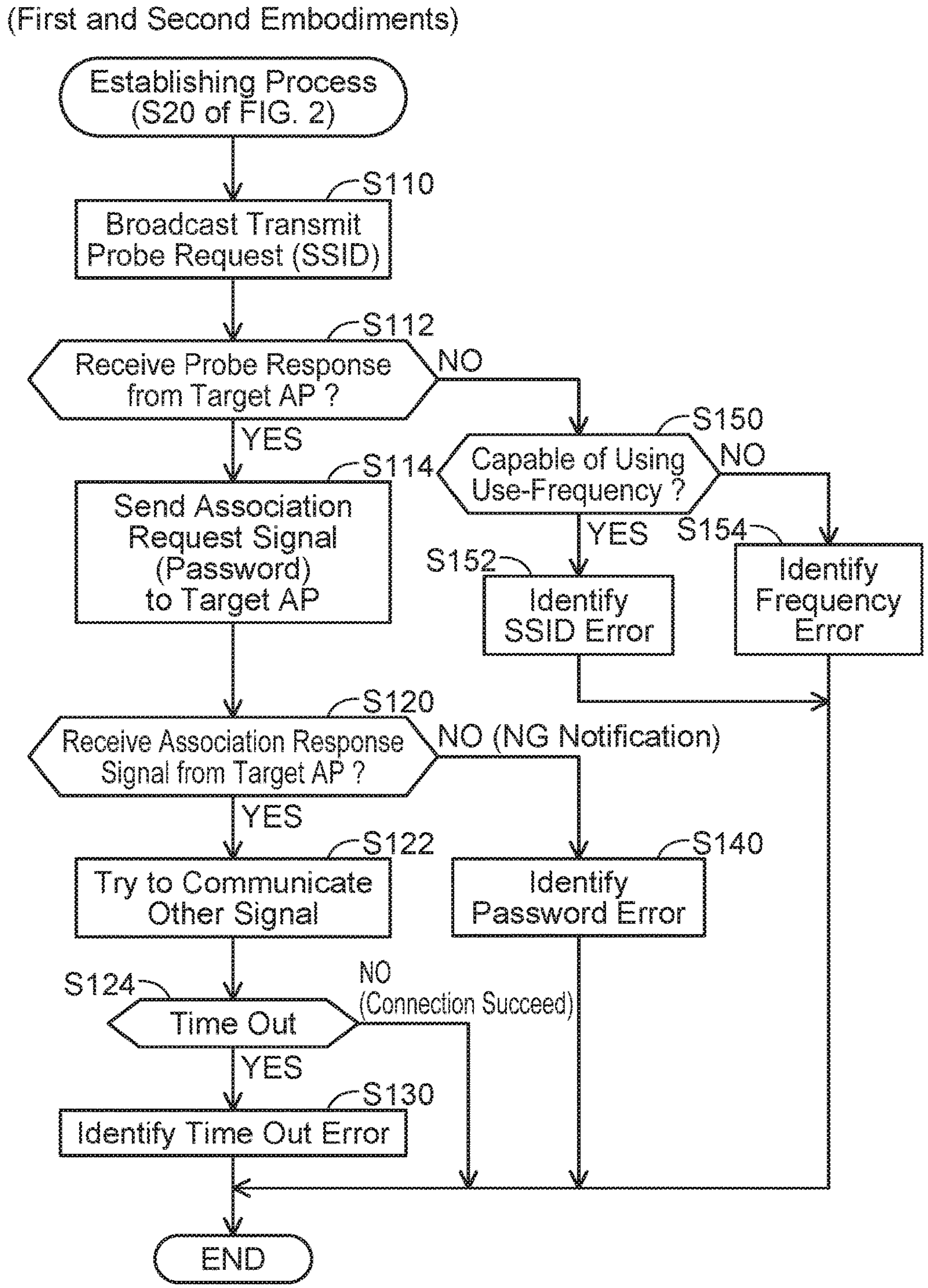
FIG. 3 shows a flowchart of an establishing process.

(Establishing Process; FIG. 3)

Next, contents of the establishing process executed in S20 of FIG. 2 will be described with reference to FIG. 3. In the establishing process, the CPU 132 tries to establish a wireless connection with an AP by executing a communication, via the Wi-Fi I/F 122, in which only a layer (e.g., physical layer, data link layer, etc.) lower than the network layer of the OSI reference model is used. In the communication, 2.4 GHz radio waves compatible with the printer 100 are used, and 5.0 GHz radio waves are not used. Moreover, in FIG. 3, since all communications executed by the printer 100 are via the Wi-Fi I/F 122, the term "via the Wi-Fi I/F 122" is omitted.

In S110, the CPU 132 broadcast transmits a probe request including the SSID (called "target SSID" below) in the target AP information.

In S112, the CPU 132 determines whether a probe response has been received from the target AP. The CPU 132 proceeds to S114 in a case where a probe response has been received from the target AP (YES in S112), and proceeds to S150 in a case where a probe response has not been received from the target AP (NO in S112). For example, a probe response is not received in a case where the power of the target AP is OFF, or in a case where an SSID different from the target SSID is set to the target AP. Further, in a case where the target AP is forming an APNW in which 5.0 GHz radio waves are used, also, it is possible that a probe response is not received.

In S114, the CPU 132 sends an Association request signal including the password (called "target password" below) in the target AP information to the target AP.

In S120, the CPU 132 determines whether the Association response signal has been received from the target AP. In a case where the Association response signal has been received from the target AP (YES in S120), the CPU 132 proceeds to S122. On the other hand, in a case where an NG signal has been received from the target AP (NO in S120), in S140 the CPU 132 identifies password error, and sets the failure flag to ON. For example, an NG signal is received in a case where a password different from the target password has been set to the target AP. When S140 ends, the process of FIG. 3 ends.

In S122, the CPU 132 tries to communicate various other signals for establishing an AP connection with the target AP (specifically Authentication signal, 4-way handshake, etc.).

In S124, the CPU 132 determines whether the process of S122 has timed out. In a case where a predetermined period has lapsed since starting of the process of S122 without an AP connection with the target AP being established (YES in S124), in S130 the CPU 132 identifies a timeout error, and sets the failure flag to ON. For example, a timeout may occur in a situation in which a communication environment between the printer 100 and the target AP is bad. A situation in which the communication environment is bad can be, e.g., a situation in which an obstacle is present between the printer 100 and the target AP, a situation in which distance between the printer 100 and the target AP is large, etc. When S130 ends, the process of FIG. 3 ends. Further, in a case where establishment of an AP connection with the target AP succeeds before the process of S122 times out (NO in S124), the CPU 132 ends the process of FIG. 3. Moreover, in this case, the failure flag is set to OFF.

In S150, the CPU 132 determines whether the printer 100 is capable of using a use-frequency. The use-frequency is the frequency used in the APNW formed by the target AP, and is 2.4 GHz or 5.0 GHz. In a case where the channel information in the target AP information indicates any value from among 1 to 13 ch, the use-frequency is 2.4 GHz. In a case where that channel information indicates any value from among 36 to 100 ch, the use-frequency is 5.0 GHz. In a case of determining that the use-frequency is 2.4 GHz, based on the channel information in the target AP information, the CPU 132 determines that the printer 100 is capable of using the use-frequency (YES in S150) and, in S152, identifies SSID error, and sets the failure flag to ON. For example, the SSID error is identified in a case where the power of the target AP is OFF, or in a case where an SSID different from the target SSID is set to the target AP. When S152 ends, the process of FIG. 3 ends. On the other hand, in a case of determining that the use-frequency is 5.0 GHz, based on the channel information in the target AP information, the CPU 132 determines that the printer 100 is not capable of using the use-frequency (NO in S150) and, in S154, identifies frequency error, and sets the failure flag to ON. When S154 ends, the process of FIG. 3 ends.

Figure 4:
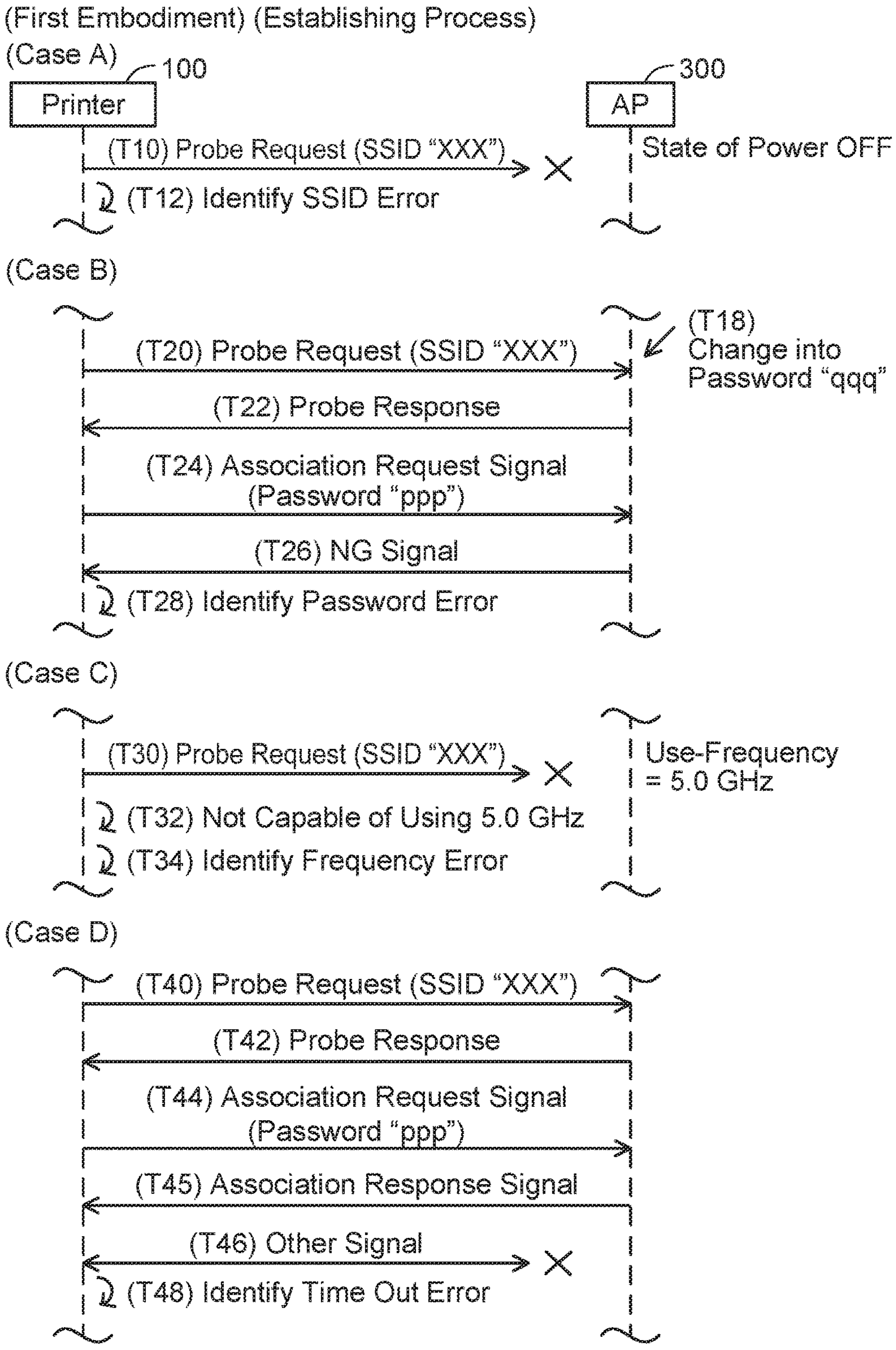
FIG. 4 shows a sequence view of specific cases of the establishing process.

(Specific Cases of Establishing Process; FIG. 4)

Next, specific cases A to D of the establishing process will be described with reference to FIG. 4. In each case, after obtaining the AP information 40*b* (i.e., the SSID "XXX", the password "ppp") of the AP 300 as the target AP information from the portable terminal 200, the printer 100 tries to establish an AP connection with the AP 300 by using the AP information 40*b*.

(Case A)

In case A, the power of the AP 300 is OFF. Even if sending a probe request including the SSID "XXX" in T10 (S110 of FIG. 3), since the power of the AP 300 is OFF, the printer 100 does not receive a probe response from the AP 300 (NO in S112). Since the use-frequency indicated by the channel information in the AP information 40*b* is 2.4 GHz, the printer 100 determines YES in S150 and, in T12, identifies SSID error (S152).

(Case B)

In case B, after the portable terminal 200 has stored the AP information 40*b* including the password "ppp", the password "qqq" instead of the password "ppp" is set to the AP 300. In T20, the printer 100 sends a probe request including the SSID "XXX" (S110 of FIG. 3), in T22 receives a probe response from the AP 300 (YES in S112) and, in T24, sends an Association request signal including the password "ppp" to the AP 300 (S114). Since the password "ppp" included in the Association request signal is not set to the AP 300, in T26 the AP 300 sends an NG signal to the printer 100 without sending an Association response signal. The printer 100 receives the NG signal from the AP 300 (NO in S120) and, in T28, identifies password error (S140).

(Case C)

In case C, the use-frequency of the AP 300 is 5.0 GHz. In this case, since the AP 300 does not receive the probe request of T30, in which 2.4 GHz radio waves are used, the AP 300 does not send a probe response to the printer 100. As a result, the printer 100 does not receive a probe response from the AP 300 (NO in S112 of FIG. 3). In T32, the printer 100 determines that it is not capable of using the use-frequency (i.e., 5.0 GHz) indicated by the channel information in the AP information 40*b* (NO in S150) and, in T34, identifies frequency error (S154).

Moreover, in case C, a situation is assumed in which the AP 300 is forming only a first APNW in which 5.0 GHz radio waves are used. However, a situation may be conceived in which the AP 300 is further also forming a second APNW in which 2.4 GHz radio waves are used. The same SSID and password (i.e., "XXX" and "ppp") as in the first APNW may be used in the second APNW also. In this case, the AP 300 receives the probe request of T30 in which 2.4 GHz radio waves are used, and sends a probe response to the printer 100. As a result, since the printer 100 receives the probe response from the AP 300 (YES in S112), the printer 100 may establish an AP connection with the AP 300. Thus, even if the use-frequency of the AP 300 indicated by the channel information in the target AP information is 5.0 GHz, which is not compatible with the printer 100, in a situation in which the AP 300 forms the second APNW, the printer 100 may establish an AP connection with the AP 300. Consequently, in the present embodiment, even in the case where the use-frequency of the AP 300 is 5.0 GHz, the printer 100 sends the probe request in S110 of FIG. 3, and tries to establish an AP connection with the AP 300. Moreover, in a modification, the printer 100 executes the process of S150 before executing the process of S110 and, in case of determining that it is not capable of using the use-frequency (NO in S150), may identify frequency error in S154 without sending a probe request. Then, in case of determining that it is capable of using the use-frequency (YES in S150), the printer 100 executes S110 and S112, and may proceed to S114 in the case of YES in S112, and may proceed to S152 in the case of NO in S112. That is, the printer 100 may execute a determining process (S150) to determine whether it is capable of using the use-frequency before the processing (i.e., communication of the signals) to establish the AP connection. Further, in another modification, the printer 100 may execute the aforementioned determining process after executing the establishing process of S20 of FIG. 2 until the storing instruction is supplied in S42. That is, the printer 100 may execute the determining process after the establishing process. Moreover, in this other modification, in the case where NO is determined in S112, the printer 100 sets the failure flag to ON, and ends the process of FIG. 3.

(Case D)

In case D, a situation is assumed in which the communication environment between the printer 100 and the AP 300 is bad. T40 to T44 are the same as T20 to T24. Since the password "ppp" included in the Association request signal is set in the AP 300, in T45 the AP 300 sends an Association response signal to the printer 100. Upon receiving the Association response signal from the AP 300 (YES in S120), in T46 the printer 100 tries communication of another signal with the AP 300 (S122), but times out (YES in S124). As a result, in T48, the printer 100 identifies timeout error (S130).

Figure 5:
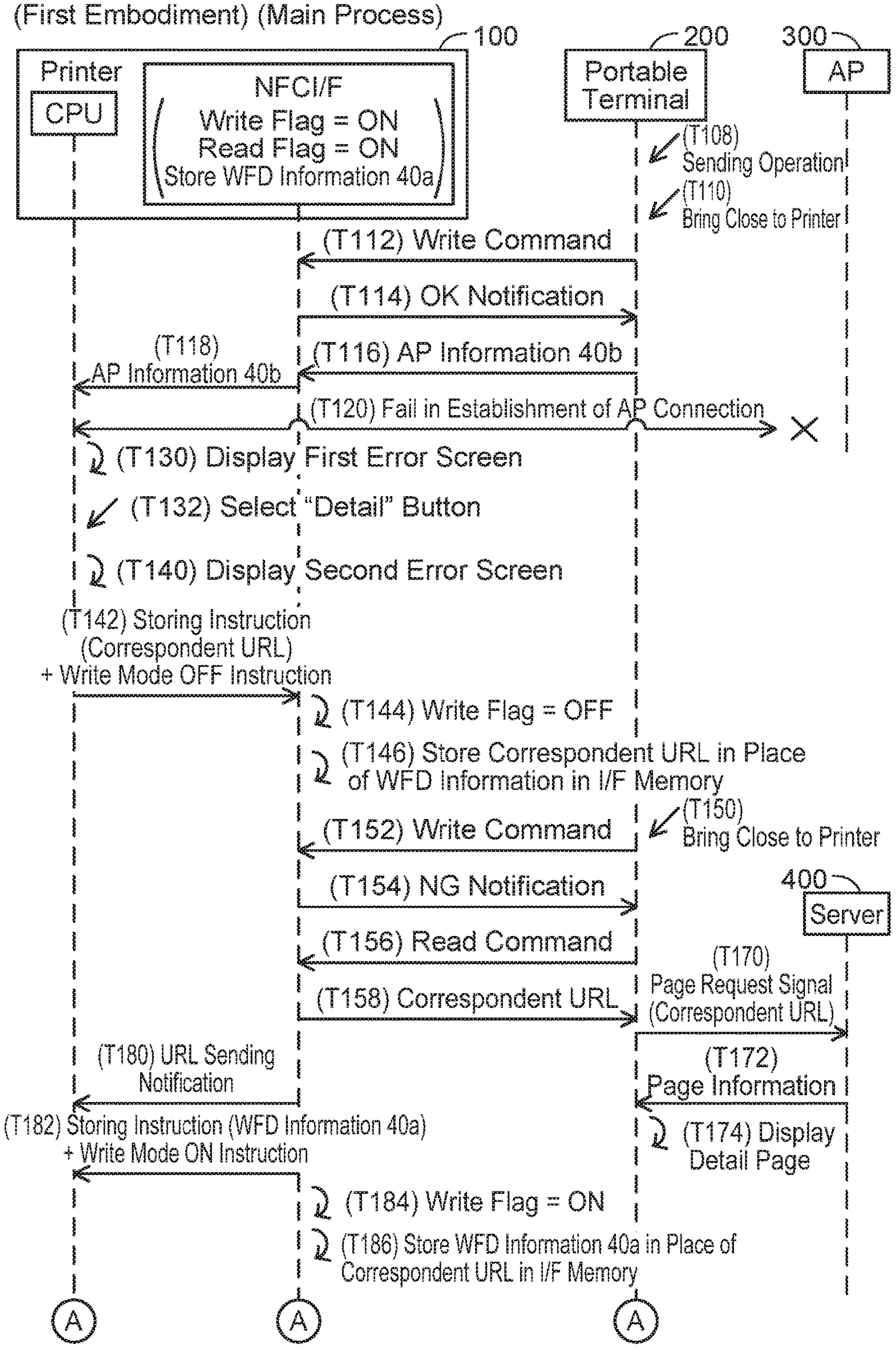
FIG. 5 shows a sequence view of a specific case of the main process.

(Specific Case of Main Process; FIG. 5)

Next, a specific case realized by the main process of FIG. 2 will be described with reference to FIG. 5. In an initial state of FIG. 5, the Write flag and the Read flag in the NFC I/F 124 are each set to ON. Further, the WFD information 40*a* is being stored in the I/F memory 126.

In T108, the user performs a sending operation on the portable terminal 200. The sending operation includes an operation of starting the application program 204, and an operation for selecting a button indicating sending of the AP information 40*b*. The following processes executed by the portable terminal 200 are, basically, realized by the application program 204. In T110, the user brings the portable terminal 200 close to the printer 100.

Upon receiving a Write command from the portable terminal 200 in T112, since the Write flag is ON, in T114 the processor 125 sends an OK notification to the portable terminal 200. The Write command is a confirmation signal for confirming whether it is possible to write information (i.e., whether the printer 100 is capable of receiving AP information). Upon receiving the AP information 40*b* from the portable terminal 200 in T116, in T118 the processor 125 supplies the AP information 40*b* to the CPU 132.

Upon obtaining the AP information 40*b* from the NFC I/F 124 (YES in S10 of FIG. 2), in T120 the CPU 132 tries to establish an AP connection with the AP 300 by using the AP information 40*b* (S20). However, for some reason, establishment of the AP connection fails (YES in S30). In T130, the CPU 132 causes the display unit 114 to display the first error screen ES1 (S32).

In T132, the user selects the "detail" button B1 in the first error screen ES1 (YES in S36 of FIG. 2). In T140, the CPU 132 causes the display unit 114 to display the second error screen ES2 (S40) and, in T142, supplies the storing instruction including the correspondent URL, and the Write mode OFF instruction, to the NFC I/F 124 (S42).

Upon obtaining the storing instruction and the Write mode OFF instruction, in T144 the processor 125 sets the Write flag to OFF and, in T146 deletes the WFD information 40*a* from the I/F memory 126, and stores the correspondent URL in the I/F memory 126.

When the portable terminal 200 is brought close to the printer 100 in T150, in T152 the portable terminal 200 sends the Write command to the printer 100.

Upon receiving the Write command from the portable terminal 200, since the Write flag is OFF, in T154 the processor 125 sends an NG notification to the portable terminal 200. As a result, the printer 100 is prohibited from receiving and using AP information from the portable terminal 200. Thereby, it is possible to prevent the printer 100 from re-receiving the AP information from the portable terminal 200 and re-trying to establish an AP connection before the user performs a measure for eliminating the cause of failure to establish the AP connection. As a result, the processing load of the printer 100 can be reduced.

In response to receiving the NG notification from the printer 100, the portable terminal 200 can know that information cannot be written. In this case, in T156 the portable terminal 200 sends, to the printer 100, a Read command, which is a confirmation signal for confirming whether it is capable of reading information (i.e., whether the printer 100 is capable of sending the correspondent URL).

Upon receiving the Read command from the portable terminal 200, since the Read flag is ON, in T158 the processor 125 sends the correspondent URL in the I/F memory 126 to the portable terminal 200.

In T170, the portable terminal 200 sends a page request signal including the correspondent URL to the server 400 via the internet 4. The page request signal is a signal for requesting page information representing the detail page indicated by the correspondent URL. In T172, the portable terminal 200 receives the page information from the server 400 and, in T174, displays the detail page represented by the page information. Since the display unit of the portable terminal 200 usually has higher functionality than the display unit 114 of the printer 100, the present embodiment, which causes the portable terminal 200 to display the detail page, can improve convenience when the user looks at the detail page. By looking at the detail page, the user can know the cause of the failure to establish the AP connection, the measure to be executed, and can execute that measure.

In T180, the processor 125 supplies the URL sending notification to the CPU 132. Upon obtaining the URL sending notification from the NFC I/F 124, in T182 the CPU 132 supplies the storing instruction including the WFD information 40*a*, and the Write mode ON instruction to the NFC I/F 124.

Upon obtaining the storing instruction and the Write mode OFF instruction, in T184 the processor 125 sets the Write flag to ON and, in T186, deletes the correspondent URL from the I/F memory 126, and stores the WFD information 40*a* in the I/F memory 126.

Figure 6:
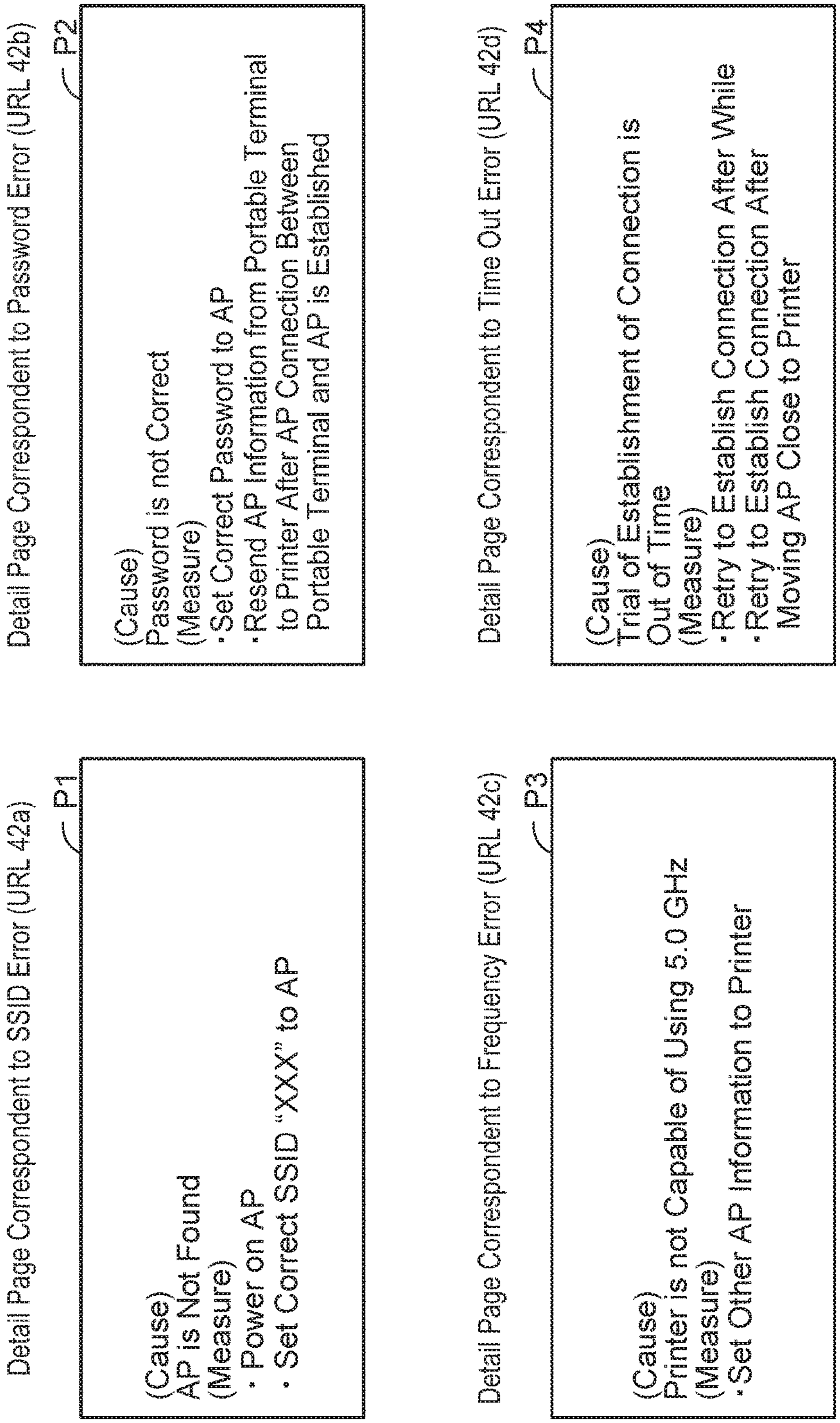
FIG. 6 shows detail pages corresponding to errors.

(Detail Pages Correspondent to Errors; FIG. 6)

Next, contents of the detail pages will be described with reference to FIG. 6. A detail page P1 is a page indicated by the URL 42*a* correspondent to SSID error. The detail page P1 includes a message indicating that the cause is the target AP is not found. The detail page P1 further includes a message indicating two measures for eliminating the SSID error. One measure is turning ON the power of the AP 300, the other measure is setting the correct SSID "XXX" to the AP 300.

A detail page P2 is a page indicated by the URL 42*b* correspondent to password error. The detail page P2 includes a message indicating that the cause is that the password of the target AP is not correct. The detail page P2 further includes a message indicating two measures for eliminating the password error. One measure is setting the correct password to the target AP. The other measure is to resend the AP information from the portable terminal 200 to the printer 100 after an AP connection between the portable terminal 200 and the target AP has been established.

A detail page P3 is a page indicated by the URL 42*c* correspondent to frequency error. The detail page P3 includes a message indicating that the cause is that the printer 100 is not capable of using the use-frequency of the target AP. The detail page P3 further includes a message indicating a measure for eliminating the frequency error. That measure is to set other AP information to the printer 100.

A detail page P4 is a page indicated by the URL 42*d* correspondent to timeout error. The detail page P4 includes a message indicating that the cause is that the trial of establishment of the AP connection is timed out. The detail page P4 further includes a message indicating two measures for eliminating the timeout error. One measure is to retry to establish the AP connection after a while, the other measure is to retry to establish the AP connection after moving the AP 300 close to the printer 100.

As described above, in the present embodiment, the detail pages P1 to P4 indicate both the cause of failure to establish the AP connection, and a measure for eliminating that cause. Consequently, the user can know the cause and the measure, and can execute that measure to properly establish the AP connection between the printer 100 and the target AP. Moreover, in a modification, the detail pages may indicate only one from among the cause and the measure.

Figure 7:
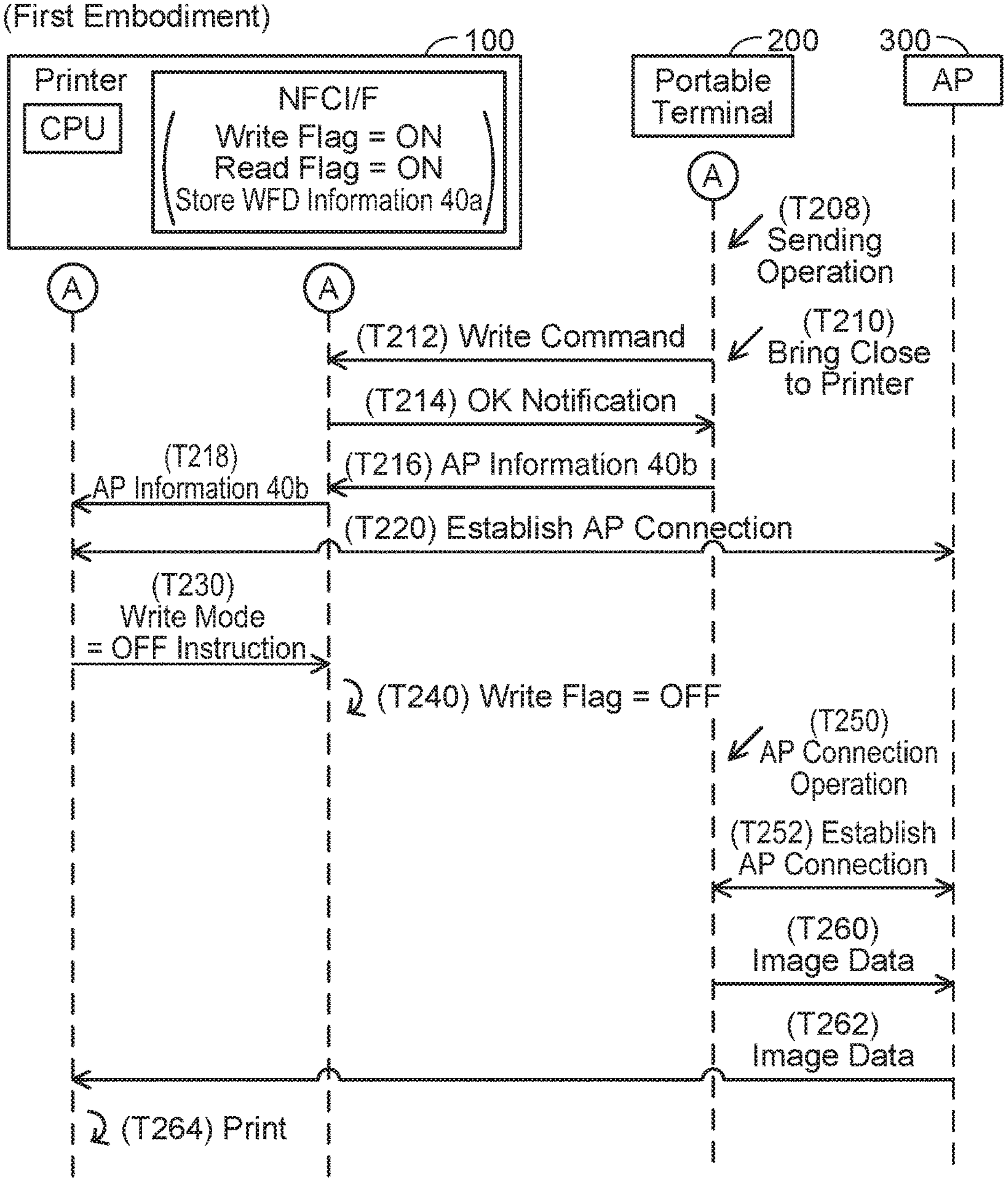
FIG. 7 shows a sequence view of a case in which a measure is executed.

(Specific Case in Case of Executing the Measure; FIG. 7)

Next, a specific case in case of executing a measure for eliminating the error will be described with reference to FIG. 7. FIG. 7 is a continuation of the case of FIG. 5 and, in particular, is showing when a measure for eliminating the error has been executed by the user. T208 to T218 are respectively the same as T108 to T118 of FIG. 5. However, in the measure for eliminating the frequency error, the AP information 40*c* of the AP 310, which is different from the AP 300, must be newly set to the portable terminal 200. In this case, the information communicated in T216 and T218 is not the AP information 40*b*, but the AP information 40*c*, and in the processes in T216, T218 and thereafter, the target is not the AP 300, but the AP 310. Below, a case for establishing an AP connection with the AP 300 will be described.

In T220, the CPU 132 succeeds in establishing an AP connection with the AP 300 (YES in S30 of FIG. 2). In this case, in T230, the CPU 132 supplies the Write mode OFF instruction to the NFC I/F 124 (S50). Upon obtaining the Write mode OFF instruction, in T240 the processor 125 sets the Write flag to OFF.

In T250, the user performs, on the portable terminal 200, an AP connection operation for establishing an AP connection between the portable terminal 200 and the AP 300. In T252, the portable terminal 200 establishes an AP connection with the AP 300 by executing communication with the AP 300 of various signals (specifically, probe request, Association request signal, Authentication signal, 4-way handshake, etc.). Thereby, a state is constructed in which both the printer 100 and the portable terminal 200 belong to the APNW formed by the AP 300. Moreover, in a case where the portable terminal 200 has established an AP connection with the AP 300 before execution of the processes of FIGS. 7, T250 and T252 are omitted.

In the present embodiment, the printer 100 establishes an AP connection with the AP 300 by using the AP information 40*b* received via the NFC I/F 124. Consequently, the user does not need to execute an operation to directly input the AP information 40*b* to the printer 100. Consequently, convenience of the user can be increased.

In a state of belonging to the APNW, the CPU 132 can execute communication with another apparatus (e.g., the portable terminal 200) belonging to the APNW via the AP 300 by using all layers of the OSI reference model. For example, in a case where the user wishes to cause the printer 100 to execute a print, in T260 and T262, image data representing an image of a print target is sent from the portable terminal 200 to the printer 100 via the AP 300. In this case, the CPU 132 receives the image data from the portable terminal 200 via the Wi-Fi I/F 122 and the AP 300 and, in T264, causes the print performing unit 116 to perform a print of the image represented by the image data.

Figure 8:
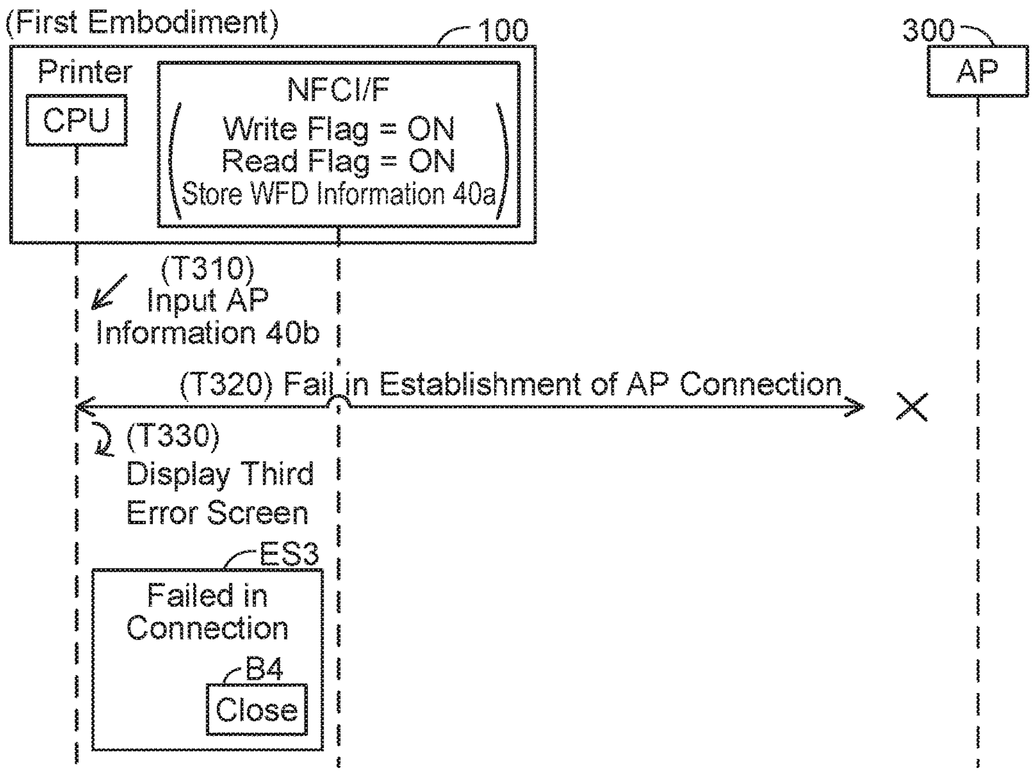
FIG. 8 shows a sequence view of a case in which AP information is input by a user.

(Case Where AP Information is Input by User; FIG. 8)

Next, a case in which the AP information is input directly to the printer 100 by the user will be described with reference to FIG. 8. An initial state of FIG. 8 is the same as the initial state of FIG. 5. The processes of FIG. 8 may be executed before execution of T108 of FIG. 5, or executed after execution of T186. In T310, the user operates the operation unit 112 to directly input the AP information 40*b* to the printer 100. Thereby, the CPU 132 accepts the input of the AP information 40*b*. In T320, for some reason, the establishment of the AP connection fails.

In T330, the CPU 132 causes the display unit 114 to display a third error screen ES3. The third error screen ES3 includes a message indicating that establishment of the AP connection failed, and a "close" button B4. The "close" button B4 is a button for ending the display of the third error screen ES3. In the case of FIG. 8, it is possible that an apparatus capable of executing NFC communication (e.g., the portable terminal 200) is not present in the surroundings of the printer 100. Therefore, the printer 100 does not execute the process for sending information relating to failure to establish the AP connection to an external via the NFC I/F 124. Thereby, the processing load of the printer 100 can be reduced. Moreover, in a modification, the AP information 40*c* of the AP 310 may be input instead of the AP information 40*b* of the AP 300 in T310, and a trial to establish an AP connection with the AP 310 may be performed in T320.

Figure 9:
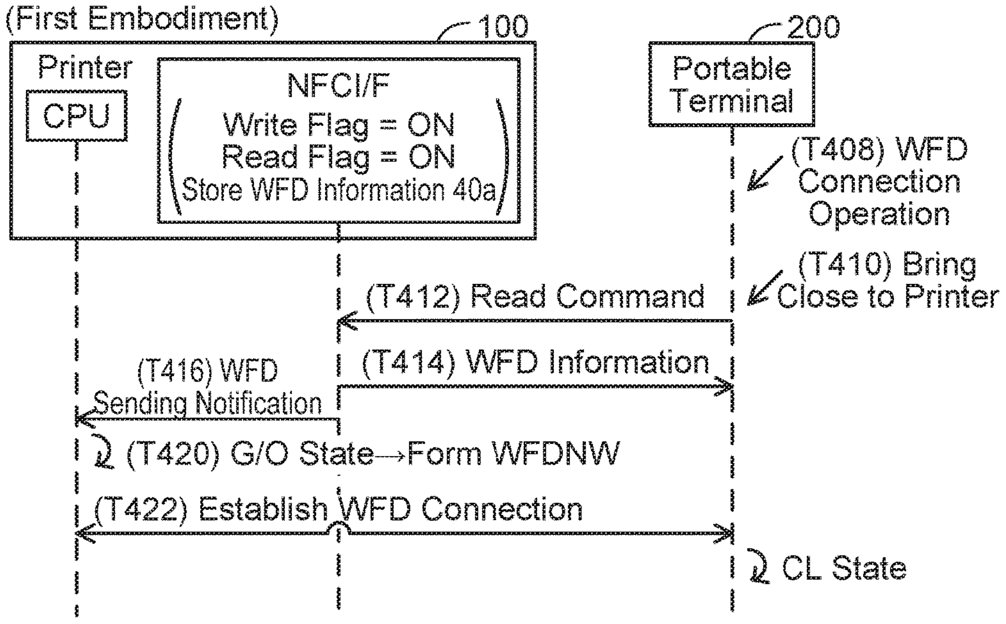
FIG. 9 shows a sequence view of a case in which the printer sends WFD information to a portable terminal.

(Case Where Printer 100 Sends WFD Information to Portable Terminal 200; FIG. 9)

Next, a case in which the printer 100 sends the WFD information 40*a* to the portable terminal 200 will be described with reference to FIG. 9. An initial state of FIG. 9 is the same as the initial state of FIG. 5. The processes of FIG. 9 may be executed before execution of T108 of FIG. 5, or executed after execution of T186. In T408, the user performs, on the portable terminal 200, a WFD connection operation for establishing a WFD connection between the printer 100 and the portable terminal 200. The WFD connection operation includes an operation of starting the application program 204, and an operation for selecting a button indicating establishment of a WFD connection.

The portable terminal 200 executes the WFD connection operation (T408) and, upon being brought close to the printer 100 (T410), sends the Read command to the printer 100 in T412 without sending the Write command.

Upon receiving the Read command from the portable terminal 200, since the Read flag is ON, in T414 the processor 125 sends the WFD information 40*a* in the I/F memory 126 to the portable terminal 200. Next, in T416, the processor 125 supplies, to the CPU 132, a WFD sending notification indicating that the WFD information 40*a* has been sent to the portable terminal 200.

Upon obtaining the WFD sending notification, in T420 the CPU 132 shifts the operating state of the printer 100 from device state to G/O state, and forms a WFDNW. In T422, the CPU 132 establishes a WFD connection with the portable terminal 200 by executing, with the portable terminal 200, the communication of various signals (specifically, probe request, Association request signal, Authentication signal, 4-way handshake, etc.). During this communication, the CPU 132 receives the SSID and password in the WFD information 40*a* from the portable terminal 200, and executes authentication thereof. In a case where the authentication succeeds, the CPU 132 establishes a WFD connection with the portable terminal 200, causing the portable terminal 200 to belong to the WFDNW as a CL state apparatus.

As described above, since the printer 100 stores the WFD information 40*a* in the I/F memory 126, the printer 100 can establish the WFD connection with the portable terminal 200. Then, by using the WFDNW, the printer 100 can execute a WFD communication with the portable terminal 200. For example, the printer 100 can directly receive the image data representing the image of the print target from the portable terminal 200, not via an AP.

Result of First Embodiment

According to the present embodiment, as shown in FIG. 5, in the case where the establishment failed of the AP connection using the AP information 40*b* received via the NFC I/F 124, (T120) the printer 100 sends the correspondent URL to the portable terminal 200 via the NFC I/F 124 (T142, T146, T158). Consequently, it is possible, via the NFC I/F 124, which is the same I/F for receiving the AP information 40*b*, to notify the user of the portable terminal 200 of information relating to failure to establish the AP connection. Further, since the Write flag is maintained as OFF between T144 and T184, it is possible to prevent the printer 100 from re-receiving the AP information 40*b* from the portable terminal 200 and re-trying to establish the AP connection. As a result, the processing load of the printer 100 can be reduced.

(Correspondence Relationship)

The printer 100 is an example of "communication apparatus". The portable terminal 200 is an example of "external apparatus" and "particular apparatus". The access point 300 is an example of "first access point" and "second access point". The NFC I/F 124, the Wi-Fi I/F 122, and the operation unit 112 are examples of "first interface", "second interface" and "accepting unit", respectively.

The NFC scheme and the Wi-Fi scheme are examples of "first communication scheme" and "second communication scheme", respectively. The AP connection is an example of "first wireless connection" and "second wireless connection". The first error screen ES1 and the second error screen ES2 are examples of "first screen" and "second screen", respectively. The messages included in the detail pages P1 to P4 of FIG. 6, and the message included in the second error screen ES2 are examples of "first message" and "second message", respectively. The correspondent URL and the WFD information 40*a* are examples of "failure information" and "wireless setting information", respectively. The timing at which the user selects the "detail" button B1 in the first error screen ES1, and the timing at which movement to bring the portable terminal 200 close to the printer 100 are examples of "first timing" and "second timing", respectively. The movement to bring the portable terminal 200 close to the printer 100 is an example of "movement for sending the failure information" and "movement for outputting the failure information". The movement for giving an instruction for ending the display of the second error screen is an example of "movement for ending a state capable of sending the failure information" and "movement for ending a state capable of outputting the failure information". The state in which the Write flag is OFF is an example of "prohibition mode". The Write command and the OK notification are examples of "confirmation signal" and "response signal", respectively.

Second Embodiment

In a second embodiment, in the case where establishment of the AP connection fails, the printer 100 re-tries to establish the AP connection.

In the second embodiment, the NFC I/F 124 is an NFC forum device. That is, as shown in FIG. 1, the NFC I/F 124 is an I/F capable of selectively operating in any mode of P2P mode, R/W mode, and CE mode. Each mode is set to ON or OFF. Below, the state in which each mode is set may be described as P2P mode=ON. Moreover, in a situation in which the processes described below are executed, always P2P mode=OFF, R/W mode=OFF, and CE mode=ON. The I/F memory 126 is further storing a prohibition flag. The prohibition flag shows either ON or OFF; ON meaning that the printer 100 is prohibited from receiving information from an external via the NFC I/F 124 and using the information (i.e., writing information from an external), and OFF meaning that the printer 100 is not prohibited. The processor 125 sets the prohibition flag to OFF in a case of obtaining the Write mode ON instruction from the CPU 132, and sets the prohibition flag to ON in a case of obtaining the Write mode OFF instruction.

Figure 10:
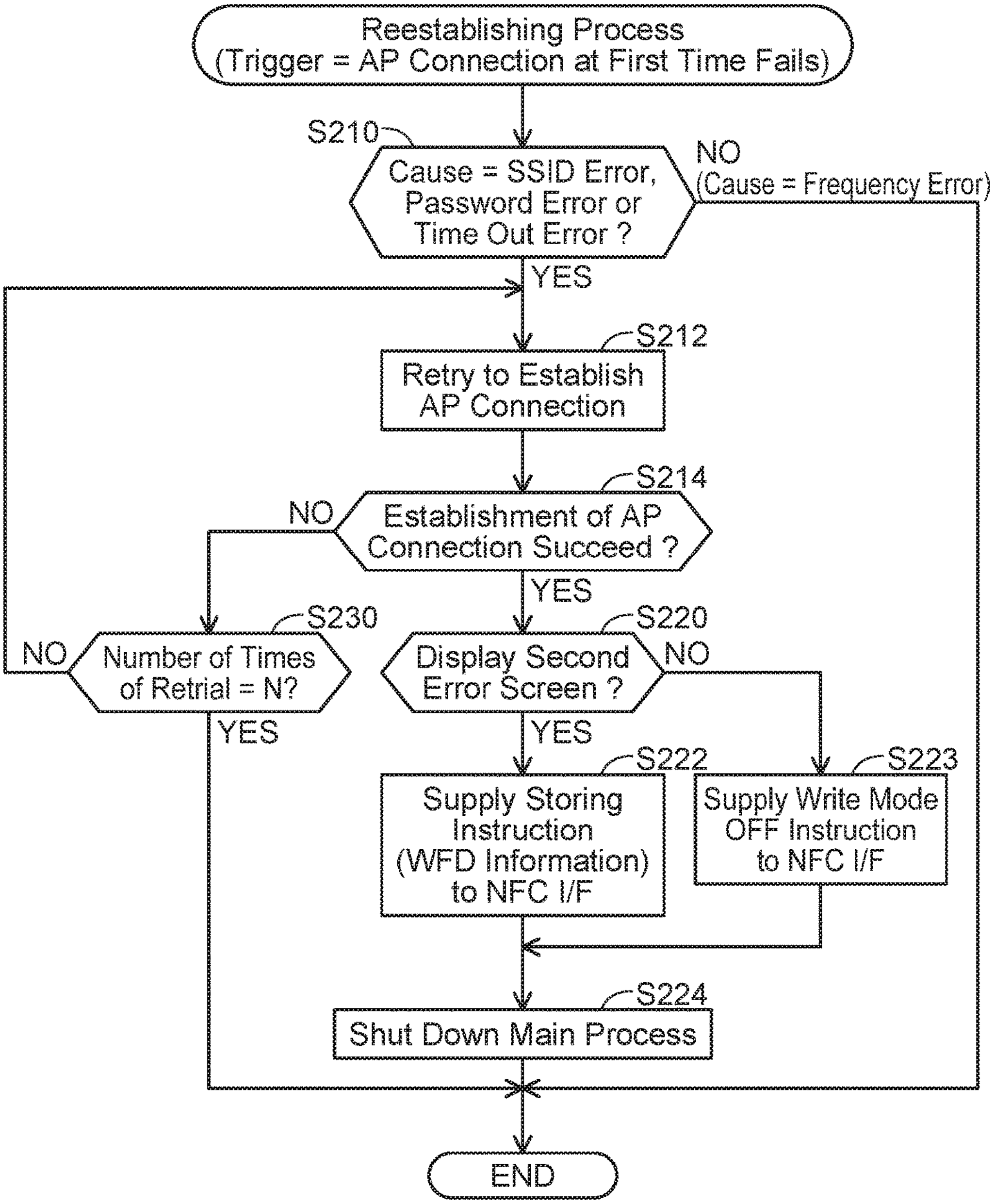
FIG. 10 shows a flowchart of a reestablishing process of a second embodiment.

(Reestablishing Process of Printer 100; FIG. 10)

Next, the contents of a reestablishing process executed by the CPU 132 of the printer 100 will be described with reference to FIG. 10. The reestablishing process is executed in parallel with the main process of FIG. 2. The reestablishing process is started with a first time of failing to establish the AP connection (YES in S30) as a trigger.

In S210, the CPU 132 determines whether the cause of the failure to establish the AP connection is any of SSID error, password error, and timeout error. In a case where any of SSID error, password error, and timeout error (called "specific error" below) has been identified in the establishing process of FIG. 3 (YES in S210), the CPU 132 proceeds to S212, and re-tries to establish the AP connection with the target AP by re-using the target AP information. On the other hand, in a case where frequency error has been identified in the establishing process of FIG. 3 (NO in S210), the CPU 132 ends the reestablishing process. In this case, the CPU 132 does not re-try to establish the AP connection.

The reason for re-trying to establish the AP connection by re-using the target AP information in a case where specific error is the cause of the failure to establish the AP connection, and not re-trying to establish the AP connection in a case where frequency error is the cause, is as follows. That is, in the case where specific error is the cause, the user performing a measure for eliminating the cause may allow the AP connection with the target AP by using the target AP information to succeed (see the detail pages P1, P2, P4 of FIG. 6). That is, the AP connection with the target AP may succeed as a result of re-trying. Therefore, in the case where specific error is the cause, the target AP information is re-used to re-try establishing the AP connection. On the other hand, in the case where frequency error is the cause, AP information different from the target AP information must be set to the printer 100 in order to eliminate the cause (see the detail page P3). Then, in order for the AP connection to succeed, the printer 100 must try to establish the AP connection using the different AP information. That is, the AP connection cannot succeed by re-trying to establish the AP connection using the target AP information. Therefore, in the case where frequency error is the cause, re-trying to establish the AP connection is not performed.

In S214, the CPU 132 determines whether establishment of the AP connection with the target AP has succeeded as a result of re-trying. The CPU 132 proceeds to S220 in a case where establishment of the AP connection has succeeded (YES in S214), and proceeds to S230 in a case where establishment of the AP connection has failed (NO in S214).

In S220, the CPU 132 determines whether the second error screen ES2 is being displayed. In a case where S42 or S44 of FIG. 2 are being executed, the second error screen ES2 is being displayed. In this case, the CPU 132 determines YES in S220, and proceeds to S222. On the other hand, in a case where any of S10 to S36, S46 are executed (NO in S220), the CPU 132 proceeds to S223.

In case of proceeding to S222, since the storing instruction including the correspondent URL is sent to the NFC I/F 124 in S42 of FIG. 2, the correspondent URL is being stored in the I/F memory 126. Therefore, in S222, the CPU 132 supplies the storing instruction including the WFD information 40*a* to the NFC I/F 124. Thereby, the WFD information 40*a* instead of the correspondent URL is stored in the I/F memory 126. That is, a state capable of sending the WFD information 40*a* to the portable terminal 200 can be attained.

In case of proceeding to S223, the prohibition flag is set to OFF. Therefore, in S223, the CPU 132 supplies the Write mode OFF instruction to the NFC I/F 124. Thereby, the prohibition flag is set to ON. That is, since it becomes impossible to receive new AP information via the NFC I/F 124, it is possible to suppress deletion of the target AP information from the main memory 134.

In S224, the CPU 132 shuts down the main process of FIG. 2. Specifically, the CPU 132 ends processing during execution of the main process. Upon ending S224, the CPU 132 ends the reestablishing process.

In S230, the CPU 132 determines whether the number of times of re-trying to establish the AP connection (called "number of times of retrial" below) is N. N is a predetermined integer equal to or more than 2. The CPU 132 ends the reestablishing process in a case where the number of times of retrial is N (YES in S230), and returns to S212 in a case where the number of times of retrial is less than N (NO in S230).

Result of Second Embodiment

The same effects as in the first embodiment can also be achieved in the second embodiment. Further, in the second embodiment, in the case where specific error is the cause of failure to establish the AP connection (YES in S210), the printer 100 re-tries to establish the AP connection (S212). The retrial of establishing the AP connection is repeated until establishment of the AP connection succeeds (YES in S214), or until the number of times of retrial reaches N times (YES in S230). In a case where the measure for eliminating the cause is performed by the user before the number of times of retrial has reached N times, the establishment of the AP connection succeeds. In this case, after the measure has been executed, the same processes and operations of T208 to T218 of FIG. 7 need not be executed. Therefore, it is possible to reduce the processing load of the printer 100 and the portable terminal 200, and convenience to the user can be improved.

(Modification 1) In S32 of FIG. 2, the CPU 132 may cause the display unit 114 to display the third error screen ES3 (see FIG. 8) instead of the first error screen ES1, and further may supply the Write mode OFF instruction to the NFC I/F 124.

Then, in a case where the "close" button B4 is selected in the third error screen ES3, the CPU 132 may supply the Write mode ON instruction to the NFC I/F 124, and end the main process. In this case, the CPU 132 does not execute S36 to S46 of FIG. 2. That is, the correspondent URL is not sent to the portable terminal 200. That is, "sending, to the external apparatus, failure information" can be omitted. Further, the process of causing the display unit 114 to display the third error screen ES3 is an example of "outputting".

In the modification above, when establishment of the AP connection failed, the Write mode OFF instruction is supplied to the NFC I/F 124, and when the "close" button B4 is selected, the Write mode ON instruction is supplied to the NFC I/F 124. That is, "first timing" may be the timing at which establishment of the AP connection failed. "Second timing" may be the timing at which the "close" button B4 is selected. In this case, the movement for selecting the "close" button B4 is an example of "movement for ending output of the failure information".

In another modification, in S32 of FIG. 2 the CPU 132 may cause the display unit 114 to display a fourth error screen instead of the first error screen ES1, and further may supply the Write mode OFF instruction to the NFC I/F 124. The fourth error screen includes a message indicating that establishment of the AP connection failed, a "detail" button, and a "close" button. The "detail" button is a button for selecting necessity of displaying, in the printer 100, a message indicating the cause of failure to establish the AP connection, and a measure for eliminating that cause. The "close" button is a button for selecting unnecessity of displaying the aforementioned message, and for ending the display of the fourth error screen. Then, in a case where the "detail" button has been selected in the fourth error screen, the CPU 132 may cause the display unit 114 to display the aforementioned message and, further, may supply the Write mode ON instruction to the NFC I/F 124. That is, when the establishment of AP connection failed, the Write mode OFF instruction is supplied to the NFC I/F 124, and when the "detail" button is selected in the fourth error screen, the Write mode ON instruction is supplied to the NFC I/F 124. That is, "first timing" may be the timing at which establishment of the AP connection failed. "Second timing" may be the timing at which the "detail" button is selected in the fourth error screen or, in a case where the aforementioned message and the "close" button are displayed in the display unit 114, may be the timing at which the "close" button is selected. In this case, the movement for selecting the "detail" button in the fourth error screen, and the movement for selecting the aforementioned message and the "close" button displayed in the display unit 114 are examples of "movement for outputting the failure information" and "movement for ending output of the failure information", respectively.

In yet another modification, the CPU 132 may cause the display unit 114 to display the fourth error screen instead of the first error screen ES1 in S32 of FIG. 2. The fourth error screen includes a message indicating that establishment of the AP connection failed, a "detail" button, and a "close" button. The "detail" button is a button for selecting necessity of displaying, in the printer 100, a message indicating the cause of failure to establish the AP connection, and a measure for eliminating that cause. The "close" button is a button for selecting unnecessity of displaying the aforementioned message, and for ending the display of the fourth error screen. In a case where the "detail" button has been selected in the fourth error screen, the CPU 132 may cause the display unit 114 to display the aforementioned message and, further, may supply the Write mode OFF instruction to the NFC I/F 124. The printer 100 causes the display unit 114 to display the aforementioned message and the "close" button. The "close" button is a button for selecting unnecessity of displaying the aforementioned message, and for ending the display of the aforementioned message. In a case where the "close" button is selected, the printer 100 may supply the Write mode ON instruction to the NFC I/F 124. That is, "first timing" may be the timing at which the "detail" button is selected in the fourth error screen, and "second timing" may be the timing at which the "close" button is selected in the case where the aforementioned message and the "close" button are displayed in the display unit 114.

(Modification 2) "First interface" is not restricted to the NFC I/F 124, but may be, e.g., an I/F in accordance with the Bluetooth (registered trademark) scheme, or an I/F in accordance with the TransferJet (registered trademark) scheme.

(Modification 3) Instead of the correspondent URL indicating the detail page, the printer 100 may store a message indicating both the cause of failure to establish the AP connection and the measure for eliminating that cause, in the NFC I/F 124 (T146 of FIG. 5), and send the message to the portable terminal 200 (T158). That is, "failure information" may be a message included in the detail page.

(Modification 4) In T310 of FIG. 8, the printer 100 may receive the WFD information 40*a* via the Wi-Fi I/F 122 by using a WFD communication. In this case, the Wi-Fi I/F 122 is an example of "accepting unit". In another modification, the printer 100 may further comprise an I/F different from the operation unit 112 and the I/Fs 122, 124 (e.g., an I/F in accordance with the Bluetooth scheme). In T310, the printer 100 may receive the AP information 40*b* via that different I/F. That is, "accepting unit" may be an I/F different from the operation unit. Moreover, in this case, the printer 100 may send the correspondent URL to the portable terminal 200 via that different I/F.

(Modification 5) The operation unit 112 may be unable to accept input of the AP information 40*b* (T310 of FIG. 8). That is, "accepting unit" and "executing a second establishing process" can be omitted.

(Modification 6) In case of being unable to start the Web browser program, upon receiving the correspondent URL (T158 of FIG. 5), the portable terminal 200 may send, via the NFC I/F, the correspondent URL to another apparatus (not shown) comprising a Web browser program. Then, the other apparatus may execute the same processes as T170 to T174, and display the detail page. In this case, the correspondent URL is information for causing the other apparatus to display a message included in the detail page.

Further, in another modification, in the case where establishment of the AP connection failed (T120 of FIG. 5), the printer 100 may send, to the portable terminal 200 via the NFC I/F 124, information indicating only that the establishment of the AP connection failed. That is, "failure information" may not be information for causing the external apparatus to display the first message, and may not be information corresponding to each error.

(Modification 7) Each piece of AP information may not include channel information. Further, in the case of determining NO in S112 of FIG. 3, the CPU 132 may skip S150 and proceed to S152. That is, "first access point information" may not include the frequency information.

(Modification 8) In the case of determining YES in S30 of FIG. 2, the CPU 132 may skip S32, S36 and proceed to S40. In this case, the first error screen ES1 is not displayed. That is, "causing the display to display a first screen" can be omitted.

(Modification 9) In the case of determining YES in S36 of FIG. 2, the CPU 132 may skip S40 and proceed to S42. Then, in S44, the CPU 132 may monitor only the obtaining of the URL sending notification from the NFC I/F 124. In this case, the second error screen ES2 may not be displayed. That is, "causing the display to display a second screen" can be omitted.

(Modification 10) In T186 of FIG. 5, the printer 100 may not store the WFD information 40*a* in the NFC I/F 124. That is, "storing, in the interface memory, wireless setting information" can be omitted.

(Modification 11) In the first embodiment, the Write mode may always be maintained ON. In the second embodiment, the prohibition flag may always be maintained OFF. In these cases, the printer 100 always accepts the receiving and use of information from an external via the NFC I/F 124. That is, "setting the communication apparatus in a prohibition mode" can be omitted.

(Modification 12) In the above embodiments, in the case where the printer 100 is prohibited from receiving and using information from an external via the NFC I/F 124, upon receiving the Write command from the portable terminal 200 (T152 of FIG. 5), the NFC I/F 124 sends the NG notification to the portable terminal 200 (T154). Instead, the NFC I/F 124 may send an OK notification to the portable terminal 200 upon receiving the Write command from the portable terminal 200. In this case, even if receiving the AP information 40*b* from the portable terminal 200, the NFC I/F 124 does not supply the AP information 40*b* to the CPU 132. Further, in another modification, even if receiving the Write command from the portable terminal 200, the NFC I/F 124 may not send either of the NG notification and the OK notification to the portable terminal 200. That is, the method for implementing "prohibition mode" is not restricted to sending the NG notification.

(Modification 13) In the second embodiment above, the NFC I/F 124 uses CE mode to send the correspondent URL to the portable terminal 200 in which R/W mode is set to ON. In a modification, the NFC I/F 124 may use P2P mode to send the correspondent URL to the portable terminal 200 in which P2P mode is set to ON. Further, in another modification, the NFC I/F 124 may use R/W mode to send the correspondent URL to the portable terminal 200 in which CE mode is set to ON.

(Modification 14) "Communication apparatus" is not restricted to the printer 100, but may be a multi-function device capable of executing various types of functions such as print function, scanner function, copy function, FAX function, etc., or may be a scanner capable of executing only a scan function, etc. "External apparatus" is not restricted to the portable terminal 200, but may be, e.g., a stationary terminal apparatus such as a desktop PC, etc. "Particular apparatus" is not restricted to the portable terminal 200, but may be, e.g., another apparatus that has established an AP connection with the AP 300, an apparatus connected with the AP 300 via a wired cable, an apparatus (server, etc.) connected with the internet 4, etc.

(Modification 15) In the above embodiments, each process of FIG. 2 to FIG. 5 and FIG. 7 to FIG. 10 is implemented by software (i.e., program). However, at least one process of the processes may be implemented by hardware such as a logic circuit. Further, these processes may be executed by a plurality of hardware such as CPUs, ASICs etc. or by a combination thereof. That is, these processes may not be executed by the CPU 132.

What is claimed is:

1. A communication apparatus comprising:

a display;

a first wireless interface for executing a wireless communication in accordance with a first communication scheme;

a second wireless interface for executing a wireless communication in accordance with a second communication scheme different from the first communication scheme; and a processor; and a memory storing computer-readable instructions therein, the computer-readable instructions, when executed by the processor, causing the communication apparatus to perform:

receiving first access point information from an external apparatus via the first wireless interface, the first access point information being information to be used for establishing a first wireless connection via the second wireless interface with a first access point;

executing a first establishing process for establishing the first wireless connection with the first access point using the first access point information;

in a case where the establishment of the first wireless connection succeeds, communicating with a particular apparatus via the second interface while relaying the first access point;

in a case where the establishment of the first wireless connection fails, causing the display to display a first screen for causing a user to select whether sending of failure information via the first interface is necessary or not, the failure information being information for causing the external apparatus to display a first message indicating a measure for eliminating a cause of why the establishment of the first wireless connection failed;

setting the communication apparatus in a prohibition mode at a first timing after the establishment of the first wireless connection failed, the prohibition mode being for prohibiting the communication apparatus from using the first access point information, the first timing including a timing at which necessity of sending of the failure information is selected by the user in the first screen; and canceling the prohibition mode at a second timing at which a predetermined movement performed by a user is detected after the communication apparatus is set in the prohibition mode, the predetermined movement including at least one of a movement for sending the failure information and a movement for ending a state capable of sending the failure information.

2. The communication apparatus as in claim 1, further comprising:

an accepting unit configured to accept an input of second access point information, the accepting unit not being the first interface, the second access point information being information to be used for establishing a second wireless connection with a second access point via the second interface, wherein the computer-readable instructions, when executed by the processor, cause the communication apparatus to further perform:

executing a second establishing process for establishing the second wireless connection with the second access point using the second access point information in a case where the input of the second access point information is accepted, and wherein information relating to failure of the establishment of the second wireless connection is not sent to external via the first interface even if the establishment of the second wireless connection fails.

3. The communication apparatus as in claim 1, wherein: the first access point information includes frequency information indicating a use-frequency used by the first access point, and the computer-readable instructions, when executed by the processor, cause the communication apparatus to further perform:

executing a determining process for determining, using the frequency information included in the first access point information, whether the communication apparatus is capable of executing a wireless communication in accordance with the use-frequency, wherein in a case where it is determined that the communication apparatus is not capable of executing the wireless communication in accordance with the use-frequency, the failure information relating to the cause of why the establishment of the first wireless connection failed is the use-frequency is sent to the external apparatus.

4. The communication apparatus as in claim 1, wherein the failure information is sent to the external apparatus via the first interface in a case where necessity of sending of the failure information is selected by the user in the first screen, and wherein the failure information is not sent to the external apparatus via the first interface in a case where unnecessity of sending of the failure information is selected by the user in the first screen.

5. The communication apparatus as in claim 1, wherein the first interface comprises an interface memory configured to store information to be sent to external, and the failure information is sent to the external apparatus via the first interface by causing the interface memory to store the failure information in a case where the establishment of the first wireless connection fails.

6. The communication apparatus as in claim 5, wherein the computer-readable instructions, when executed by the processor, cause the communication apparatus to further perform:

deleting the failure information from the interface memory in a case where the failure information is sent from the first interface to the external apparatus.

7. The communication apparatus as in claim 6, wherein the computer-readable instructions, when executed by the processor, cause the communication apparatus to further perform:

storing, in the interface memory, wireless setting information for establishing a wireless connection via the second interface with the communication apparatus in a case where the failure information is deleted from the interface memory.

8. The communication apparatus as in claim 5, wherein the computer-readable instructions, when executed by the processor, cause the communication apparatus to further perform:

causing the display to display a second screen including a second message recommending a user to bring the external apparatus close to the communication apparatus in a case where the failure information is stored in the interface memory; and deleting the failure information from the interface memory in a case where an instruction for ending display of the second screen is given by the user.

9. The communication apparatus as in claim 5, wherein the computer-readable instructions, when executed by the processor, cause the communication apparatus to further perform:

retrying to establish the first wireless connection with the first access point using the first access point information in a case where the establishment of the first wireless connection fails; and deleting the failure information from the interface memory in a case where the establishment of the first wireless connection succeeds as a result of the retrying without sending the failure information from the first interface to the external apparatus.

10. The communication apparatus as in claim 1, wherein the first interface is configured to perform receiving, from the external apparatus, a confirmation signal for confirming whether the communication apparatus is capable of accepting the first access point information or not; and sending, to the external apparatus in response to the confirmation signal, a response signal indicating that the communication apparatus is capable of accepting the first access point information; and the first access point information is received from an external apparatus via the first interface after the response signal is sent.

11. The communication apparatus as in claim 1, wherein the first communication scheme is NFC (Near Field Communication) scheme and the second communication scheme is Wi-Fi scheme.

12. A communication apparatus comprising:

a first interface for executing a wireless communication in accordance with a first communication scheme;

a second interface for executing a wireless communication in accordance with a second communication scheme different from the first communication scheme; and a processor; and a memory storing computer-readable instructions therein, the computer-readable instructions, when executed by the processor, causing the communication apparatus to perform:

receiving first access point information from an external apparatus via the first interface, the first access point information being information to be used for establishing a first wireless connection via the second interface with a first access point;

executing a first establishing process for establishing the first wireless connection with the first access point using the first access point information;

in a case where the establishment of the first wireless connection succeeds, communicating with a particular apparatus via the second interface while relaying the first access point;

in a case where the establishment of the first wireless connection fails, setting the communication apparatus in an outputting mode for outputting failure information relating to a failure of the establishment of the first wireless connection in response to a first movement performed by a user;

setting the communication apparatus in a prohibition mode at a first timing after the establishment of the first wireless connection failed, the prohibition mode being for prohibiting the communication apparatus from using the first access point information; and canceling the prohibition mode at a second timing at which the first movement performed by the user or a second movement for canceling the output mode performed by the user is detected after the communication apparatus is set in the prohibition mode and in the outputting mode.

13. The communication apparatus as in claim 12, further comprising:

a display, wherein the computer-readable instructions, when executed by the processor, cause the communication apparatus to further perform:

causing the display to display a first screen for causing the user to select whether outputting of the failure information is necessary or not in a case where establishment of the first wireless connection fails, wherein the first timing includes a timing at which necessity of outputting of the failure information is selected by the user in the first screen.

14. The communication apparatus as in claim 12, wherein the first interface comprises an interface memory configured to store information to be sent to external, the outputting includes sending the failure information to the external apparatus via the first interface by storing the failure information in the interface memory in a case where the establishment of the first wireless connection fails, the communication apparatus comprises:

a display, the computer-readable instructions, when executed by the processor, cause the communication apparatus to further perform:

causing the display to display a second screen including a second message recommending the user to bring the external apparatus close to the communication apparatus in a case where the failure information is stored in the interface memory, wherein the first movement is a movement of bringing the external apparatus close to the communication apparatus in order to send the failure information from the first interface to the external apparatus; and the second movement is a movement of giving an instruction for ending display of the second screen.

15. A communication apparatus comprising:

a display;

means for receiving first access point information from an external apparatus via a first interface of the communication apparatus, the first access point information being information to be used for establishing a first wireless connection via a second interface of the communication apparatus with a first access point, the first interface being for executing a wireless communication in accordance with a first communication scheme, the second interface being for executing a wireless communication in accordance with a second communication scheme different from the first communication scheme;

means for executing a first establishing process for establishing the first wireless connection with the first access point using the first access point information;

means for communicating, in a case where the establishment of the first wireless connection succeeds, with a particular apparatus via the second interface while relaying the first access point;

means for causing, in a case where the establishment of the first wireless connection fails, the display to display a first screen for causing a user to select whether sending of failure information via the first interface is necessary or not, the failure information being information for causing the external apparatus to display a first message indicating a measure for eliminating a cause of why the establishment of the first wireless connection failed;

means for setting the communication apparatus in a prohibition mode at a first timing after the establishment of the first wireless connection failed, the prohibition mode being for prohibiting the communication apparatus from using the first access point information, the first timing including a timing at which necessity of sending of the failure information is selected by the user in the first screen; and means for canceling the prohibition mode at a second timing at which a predetermined movement performed by a user is detected after the communication apparatus is set in the prohibition mode, the predetermined movement including at least one of a movement for sending the failure information and a movement for ending a state capable of sending the failure information.

16. A communication apparatus comprising:

means for receiving first access point information from an external apparatus via a first interface of the communication apparatus, the first access point information being information to be used for establishing a first wireless connection via a second interface of the communication apparatus with a first access point, the first interface being for executing a wireless communication in accordance with a first communication scheme, the second interface being for executing a wireless communication in accordance with a second communication scheme different from the first communication scheme;

means for executing a first establishing process for establishing the first wireless connection with the first access point using the first access point information;

in a case where the establishment of the first wireless connection succeeds, means for communicating with a particular apparatus via the second interface while relaying the first access point; and in a case where the establishment of the first wireless connection fails, means for setting the communication apparatus in an outputting mode for outputting failure information relating to a failure of the establishment of the first wireless connection in response to a first movement performed by a user;

means for setting the communication apparatus in a prohibition mode at a first timing after the establishment of the first wireless connection failed, the prohibition mode being for prohibiting the communication apparatus from using the first access point information; and means for canceling the prohibition mode at a second timing at which the first movement performed by the user or a second movement for canceling the outputting mode performed by the user is detected after the communication apparatus is set in the prohibition mode and in the outputting mode.

17. A communication apparatus comprising:

a first interface for executing a wireless communication in accordance with a first communication scheme;

a second interface for executing a wireless communication in accordance with a second communication scheme different from the first communication scheme;

a processor; and a memory storing computer-readable instructions therein, the computer-readable instructions, when executed by the processor, causing the communication apparatus to perform:

receiving first access point information from an external apparatus via the first interface, the first access point information being information to be used for establishing a first wireless connection via the second interface with a first access point;

executing a first establishing process for establishing the first wireless connection with the first access point using the first access point information;

in a case where the establishment of the first wireless connection succeeds, communicating with a particular apparatus via the second interface while relaying the first access point;

in a case where the establishment of the first wireless connection fails, starting output of failure information relating to a failure of the establishment of the first wireless connection;

setting the communication apparatus in a prohibition mode at a first timing after the establishment of the first wireless connection failed, the prohibition mode being for prohibiting the communication apparatus from using the first access point information; and canceling the prohibition mode at a second timing at which a predetermined movement performed by a user is detected after the communication apparatus is set in the prohibition mode, the predetermined movement including a movement for ending output of the failure information.

18. A communication apparatus comprising:

means for receiving first access point information from an external apparatus via a first interface of the communication apparatus, the first access point information being information to be used for establishing a first wireless connection via a second interface of the communication apparatus with a first access point, the first interface being for executing a wireless communication in accordance with a first communication scheme, the second interface being for executing a wireless communication in accordance with a second communication scheme different from the first communication scheme;

means for executing a first establishing process for establishing the first wireless connection with the first access point using the first access point information;

in a case where the establishment of the first wireless connection succeeds, means for communicating with a particular apparatus via the second interface while relaying the first access point;

in a case where the establishment of the first wireless connection fails, means for starting output of failure information relating to a failure of the establishment of the first wireless connection;

means for setting the communication apparatus in a prohibition mode at a first timing after the establishment of the first wireless connection failed, the prohibition mode being for prohibiting the communication apparatus from using the first access point information; and means for canceling the prohibition mode at a second timing at which a predetermined movement performed by a user is detected after the communication apparatus is set in the prohibition mode, the predetermined movement including a movement for ending output of the failure information.

19. A communication apparatus comprising:

a display;

a first wireless interface for executing a wireless communication in accordance with a first communication scheme, the first interface comprising an interface memory configured to store information to be sent externally;

a second wireless interface for executing a wireless communication in accordance with a second communication scheme different from the first communication scheme; and a processor; and a memory storing computer-readable instructions therein, the computer-readable instructions, when executed by the processor, causing the communication apparatus to perform:

receiving first access point information from an external apparatus via the first wireless interface, the first access point information being information to be used for establishing a first wireless connection via the second wireless interface with a first access point;

executing a first establishing process for establishing the first wireless connection with the first access point using the first access point information;

in a case where the establishment of the first wireless connection succeeds, communicating with a particular apparatus via the second interface while relaying the first access point;

in a case where the establishment of the first wireless connection fails, causing the interface memory to store failure information, the failure information being information for causing the external apparatus to display a first message indicating a measure for eliminating a cause of why the establishment of the first wireless connection failed;

in a case where the failure information is stored in the interface memory, causing the display to display a second screen including a second message recommending a user to bring the external apparatus close to the communication apparatus;

in a case where establishment of the first wireless connection fails, setting the communication apparatus in a prohibition mode at a first timing after the establishment of the first wireless connection failed, the prohibition mode being for prohibiting the communication apparatus from using the first access point information; and canceling the prohibition mode at a second timing at which a predetermined movement performed by a user is detected after the communication apparatus is set in the prohibition mode, the predetermined movement including at least one of a movement for sending the failure information and a movement for ending a state capable of sending the failure information, wherein the movement for sending the failure information is a movement of bringing the external apparatus close to the communication apparatus in order to send the failure information from the first interface to the external apparatus; and wherein the movement for ending the state capable of sending the failure information is a movement of giving an instruction for ending display of the second screen.

* * * * *